(12) United States Patent
Santillan Gutierrez et al.

(10) Patent No.: US 11,021,092 B2
(45) Date of Patent: Jun. 1, 2021

(54) POSITIONABLE PLATFORM WITH A RELEASABLE LOCKING MECHANISM

(71) Applicant: Ford Global Technologies, LLC, Dearborn, MI (US)

(72) Inventors: Diego Santillan Gutierrez, Tizayuca (MX); Raul Javier Elias, Mexico City (MX); Luis Enrique Gloria, Mexico City (MX); Ignacio Adan Bautista, Nicolas Romero (MX)

(73) Assignee: Ford Global Technologies, LLC, Dearborn, MI (US)

( * ) Notice: Subject to any disclaimer, the term of this patent is extended or adjusted under 35 U.S.C. 154(b) by 117 days.

(21) Appl. No.: 16/535,202

(22) Filed: Aug. 8, 2019

(65) Prior Publication Data

US 2021/0039559 A1 Feb. 11, 2021

(51) Int. Cl.
*B60N 3/00* (2006.01)
*B60R 7/04* (2006.01)

(52) U.S. Cl.
CPC .............. *B60N 3/001* (2013.01); *B60R 7/04* (2013.01)

(58) Field of Classification Search
CPC .................... B60N 3/001; B60N 3/002

USPC ................ 296/24.34, 37.8; 108/44
See application file for complete search history.

(56) References Cited

U.S. PATENT DOCUMENTS

| 6,341,821 | B1 * | 1/2002 | Rousseau ................ | B60N 2/24 |
| | | | | 297/411.36 |
| 10,106,093 | B2 | 10/2018 | Murray et al. | |
| 10,391,904 | B2 * | 8/2019 | Aktas ..................... | F16C 11/10 |

* cited by examiner

*Primary Examiner* — Dennis H Pedder
(74) *Attorney, Agent, or Firm* — David Coppiellie; Price Heneveld LLP

(57) ABSTRACT

A positionable platform for an interior of a vehicle comprising: a planar top surface; a bottom housing with a channel; and a releasable locking mechanism disposed between the planar top surface and the bottom housing. The releasable locking mechanism includes: a first bracket; a second bracket layered beside the first bracket; a button accessible for manipulation connected to the first bracket; a locked state where the second bracket extends into the channel; and an unlocked state where the movement of the button in a first direction causes movement of the first bracket in the first direction, which causes movement of the second bracket in a second direction different than the first direction that withdraws the second bracket from the channel or reduces the extension of the second bracket into the channel.

20 Claims, 32 Drawing Sheets

POSITIONABLE PLATFORM WITH A RELEASABLE LOCKING MECHANISM

FIELD OF THE INVENTION

The present invention generally relates to a positionable platform in an interior of a vehicle, and more particularly, to a positionable platform with a releasable locking mechanism.

BACKGROUND OF THE INVENTION

There is a need for a platform in a vehicle that an occupant of the vehicle can reposition and then lock in position. Such a platform should include a locking mechanism that is enclosed, relatively easy to unlock when the occupant intends to reposition the platform, and difficult to unlock when the occupant does not intend to reposition the platform.

SUMMARY OF THE INVENTION

According to a first aspect of the present invention, a positionable platform for an interior of a vehicle comprises: a planar top surface; a bottom housing with a channel; and a releasable locking mechanism disposed between the planar top surface and the bottom housing. The releasable locking mechanism includes: a first bracket; a second bracket layered beside the first bracket; a button accessible for manipulation connected to the first bracket; a locked state where the second bracket extends into the channel; and an unlocked state where the movement of the button in a first direction causes movement of the first bracket in the first direction, which causes movement of the second bracket in a second direction different than the first direction that at least partially withdraws the second bracket from the channel.

Embodiments of the first aspect of the present invention can include any one or a combination of the following features:

the bottom housing further includes a channel region defining the channel and having a top surface, and another region having a floor disposed lower than the top surface of the channel region, and projections extending upward from the floor;

the first bracket includes guides through which the projections of the bottom housing extend to limit movement of the first bracket to an axis of movement parallel to the first direction;

the second bracket includes guides through which the projections of the bottom housing additionally extend to limit movement of the second bracket to an axis of movement that is different than the axis of movement of the first bracket;

the bottom housing further includes vertical spaced walls transitioning between the channel region and the other region, and slots between each of the spaced walls that provide access from the other region to the channel defined by the channel region;

the second bracket further includes projections that extend toward the channel;

in the locked state of the releasable locking mechanism, the projections of the second bracket extend through the vertical spaced walls of the bottom housing and into the channel of the bottom housing;

in the unlocked state of the releasable locking mechanism, the projections of the second bracket either (A) do not extend through the vertical spaced walls of the bottom housing and into the channel of the bottom housing or (B) extend through the vertical spaced walls of the bottom housing and into the channel of the bottom housing to a lesser extent than in the locked state of the releasable locking mechanism;

the first bracket includes an axis of movement along which the first bracket can move during transitions between the locked state and the unlocked state of the releasable locking mechanism, and a projection;

the second bracket includes a projection receiver that receives the projection of the first bracket, and an axis of movement along which the second bracket can move during transitions between the locked state and the unlocked state of the releasable locking mechanism;

the projection of the first bracket moving along the axis of movement of the first bracket interacts with the projection receiver of the second bracket to cause the second bracket to move along the axis of movement of the second bracket;

the axis of movement of the first bracket is different than the axis of movement of the second bracket;

the projection receiver of the second bracket includes a contact surface against which the projection of the first bracket slides as the first bracket moves along the axis of movement of the first bracket, and the projection sliding against the contact surface causes the second bracket to move along the axis of movement of the second bracket;

the contact surface forms an acute angle relative to the axis of movement of the first bracket;

the acute angle is between 20 degrees and 30 degrees;

the axis of movement of the first bracket and the axis of movement of the second bracket are at least approximately orthogonal; and the releasable locking mechanism further includes a spring that biases the releasable locking mechanism to the locked state.

According to a second aspect of the present invention, an interior of a vehicle comprises: a positionable platform operably coupled to a base. The base includes: an anchor having spaced projections; and a pair of elongated rails. The positionable platform includes: a pair of elongated tracks that cooperate with the pair of elongated rails of the positionable platform to define an axis of movement of the positionable platform, along which the positionable platform can be positioned to, from, and between an extreme rearward position, an extreme forward position, and an intermediate position between the extreme rearward position and the extreme forward position; a relatively planar top surface; a bottom housing; and a releasable locking mechanism disposed between the top surface and the bottom housing. The releasable locking mechanism includes: a first bracket; a second bracket layered adjacent to the first bracket, the second bracket having spaced projections; a locked state where the projections of the second bracket are interdigitated with the projections of the anchor of the base such that the positionable platform cannot move along the axis of movement relative to the base; and an unlocked state where change in position of the first bracket from the locked state causes change in position of the second bracket from the locked state and the projections of the second bracket are not interdigitated with the projections of the anchor of the base such that the positionable platform can move along the axis of movement relative to the base.

Embodiments of the second aspect of the present invention can include any one or a combination of the following features:

the first bracket moves along an axis of movement as the releasable locking mechanism transitions between the locked state and the unlocked state;

the axis of movement of the first bracket is parallel to the axis of movement of the positionable platform;

the second bracket moves along an axis of movement as the releasable locking mechanism transitions between the locked state and the unlocked state;

the axis of movement of the second bracket is at least approximately orthogonal to the axis of movement of the first bracket;

the first bracket includes a projection;

the second bracket includes a projection receiver into which the projection of the first bracket extends;

during movement of the first bracket along the axis of movement, the projection of the first bracket contacts the projection receiver of the second bracket and causes the second bracket to move along an axis of movement that is different than the axis of movement of the first bracket;

the projection receiver of the second bracket has a contact surface that contacts the projection of the first bracket, and the contact surface forms an acute angle relative to the axis of movement of the first bracket;

the releasable locking mechanism further including a button attached to the first bracket, and the button is accessible for manipulation from the interior to cause the releasable locking mechanism to transition from the locked state to the unlocked state;

the bottom housing includes a channel region and another region adjacent to the channel region;

the channel region forms a channel in which the anchor of the base is disposed;

the first bracket includes guides that define the axis of movement of the first bracket as the releasable locking mechanism transitions between the locked state and the unlocked state;

the second bracket includes guides that define the axis of movement of the second bracket as the releasable locking mechanism transitions between the locked state and the unlocked state;

the other region of the bottom housing includes a floor and projections that extend from orthogonally from the floor, each of the projections extending through one of the guides of the first bracket and one of the guides of the second bracket;

in the locked state, the projections of the second bracket extend from the other region of the bottom housing and into the channel to interdigitate with the projections of the anchor;

the bottom housing further includes spaced walls and slots between each of the spaced walls that define a transition between the channel region and the other region;

in the locked state, the projections of the second bracket extend through slots of the bottom housing, and the spaced walls of the bottom housing are disposed in recesses between the projections of the second bracket;

the releasable locking mechanism further including a spring with a wound section, a first end extending from the wound section, and a second end extending from the wound section;

the other region of the bottom housing includes an additional projection that extends orthogonally from the floor and extends through the wound section of the spring;

the first end of the spring contacts the second bracket;

the second end of the spring contacts the bottom housing;

the spring resists movement of the second bracket along the axis of movement of the second bracket;

in the locked state, only some of the projections of the second bracket interdigitate with the projections of the anchor;

the projections of the second bracket that interdigitate with the projections of the anchor when the positionable platform is in the extreme rearward position are different than the projections of the second bracket that interdigitate with the projections of the anchor when the positionable platform is in the extreme forward position; and the projections of the second bracket that interdigitate with the projections of the anchor when the positionable platform is in the intermediate position are different than the projections of the second bracket that interdigitate with the projections of the anchor when the positionable platform is in the extreme rearward position or the extreme forward position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
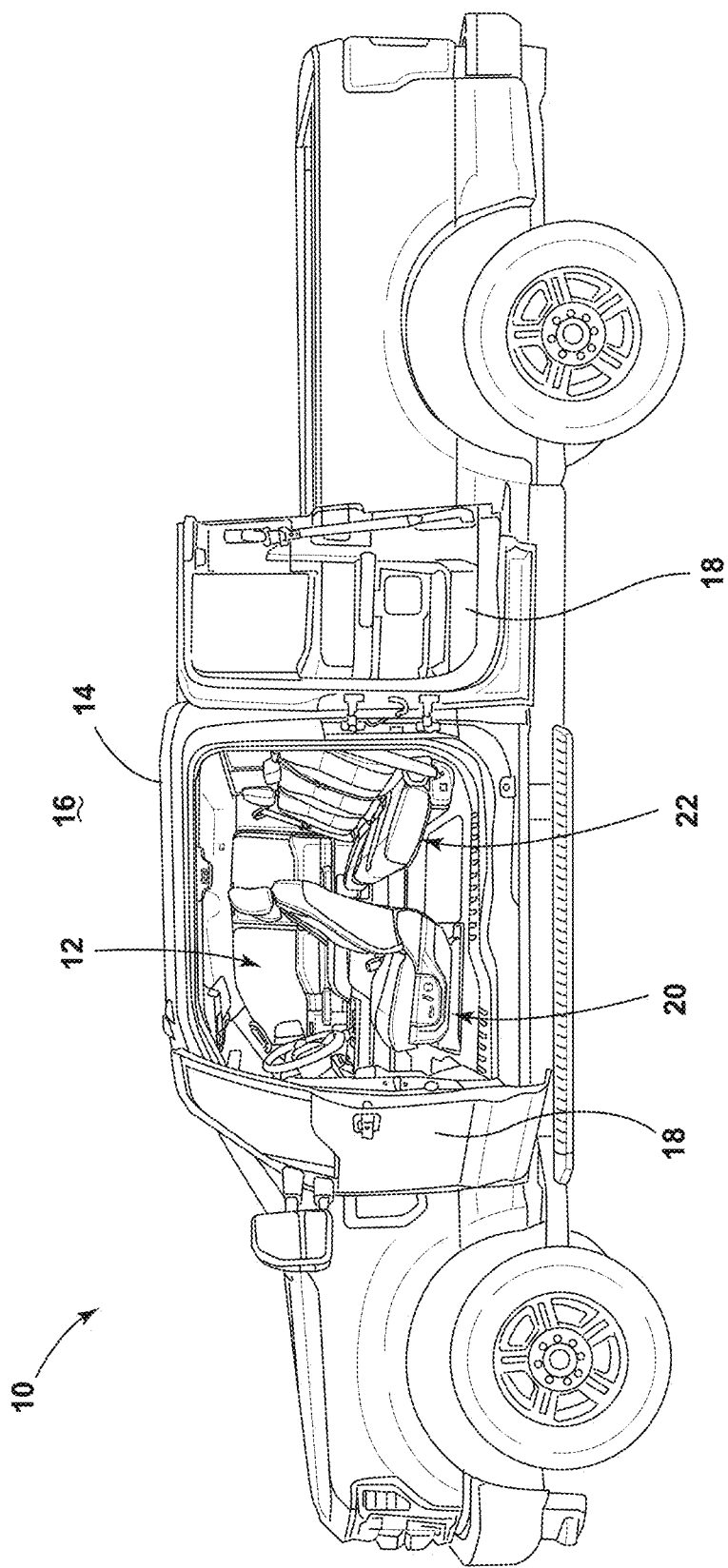
FIG. 1 is a side view of a vehicle with doors open revealing an interior and a first row of seating in the interior.
Figure 2:
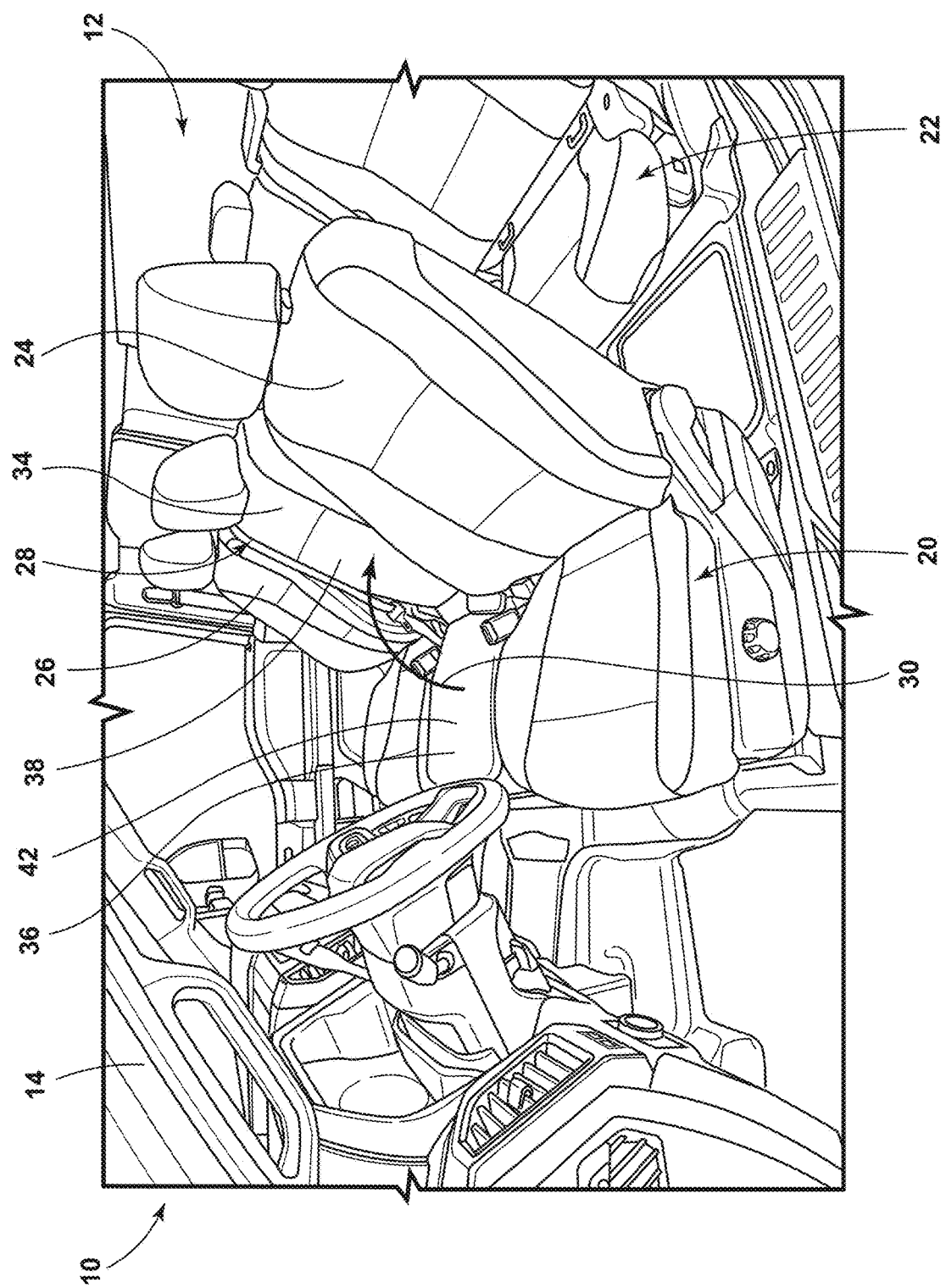
FIG. 2 is a perspective view of the first row of seating of FIG. 1, illustrating a center seating assembly disposed between a first seating assembly and a second seating assembly, and the center seating assembly having a seat and a seatback.
Figure 3:
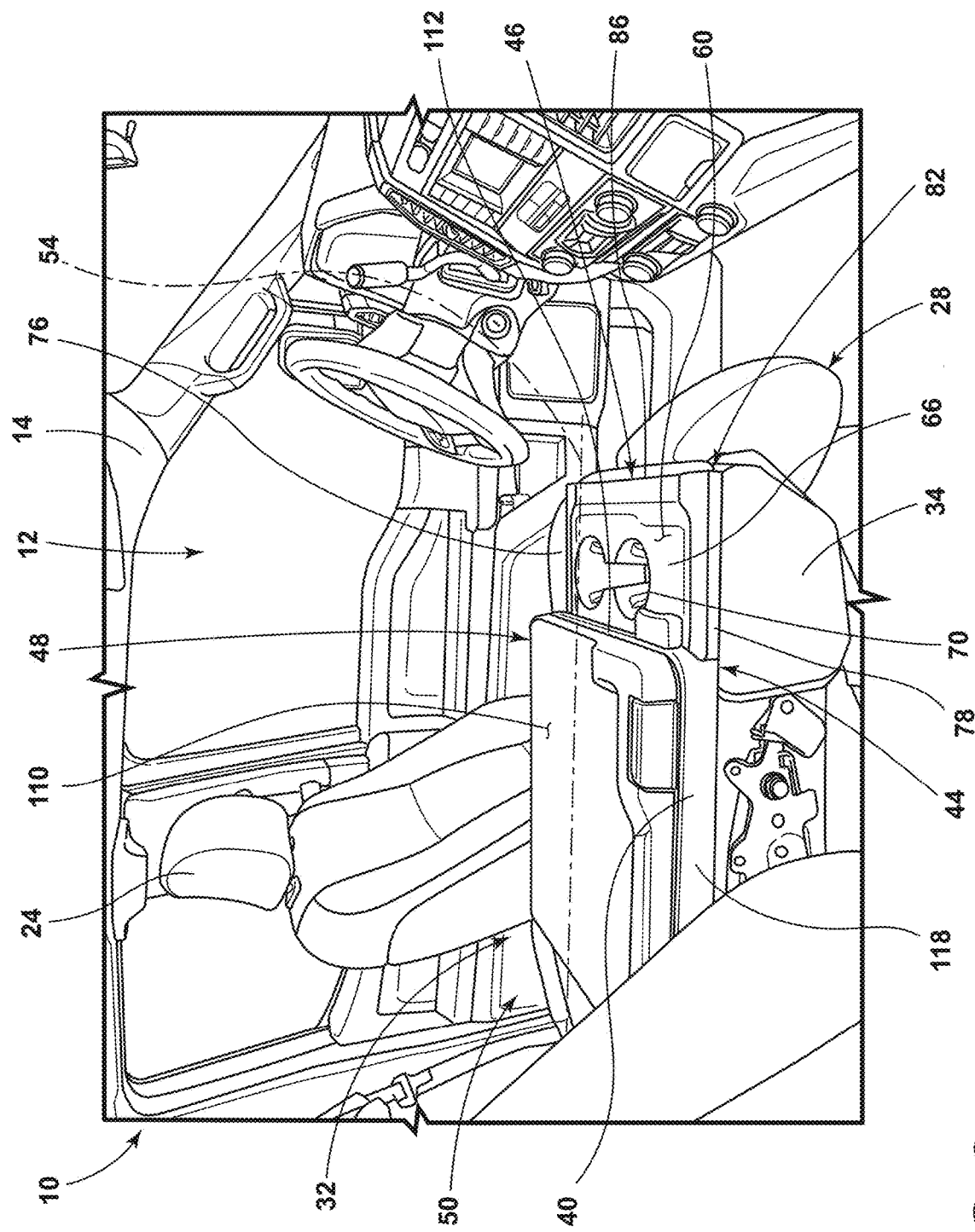
FIG. 3 is a perspective view of the center seating assembly of FIG. 1, illustrating the seatback in a folded position over the seat and providing a center console with a positionable platform in an extreme rearward position that can move about an axis of movement over a base.
Figure 4:
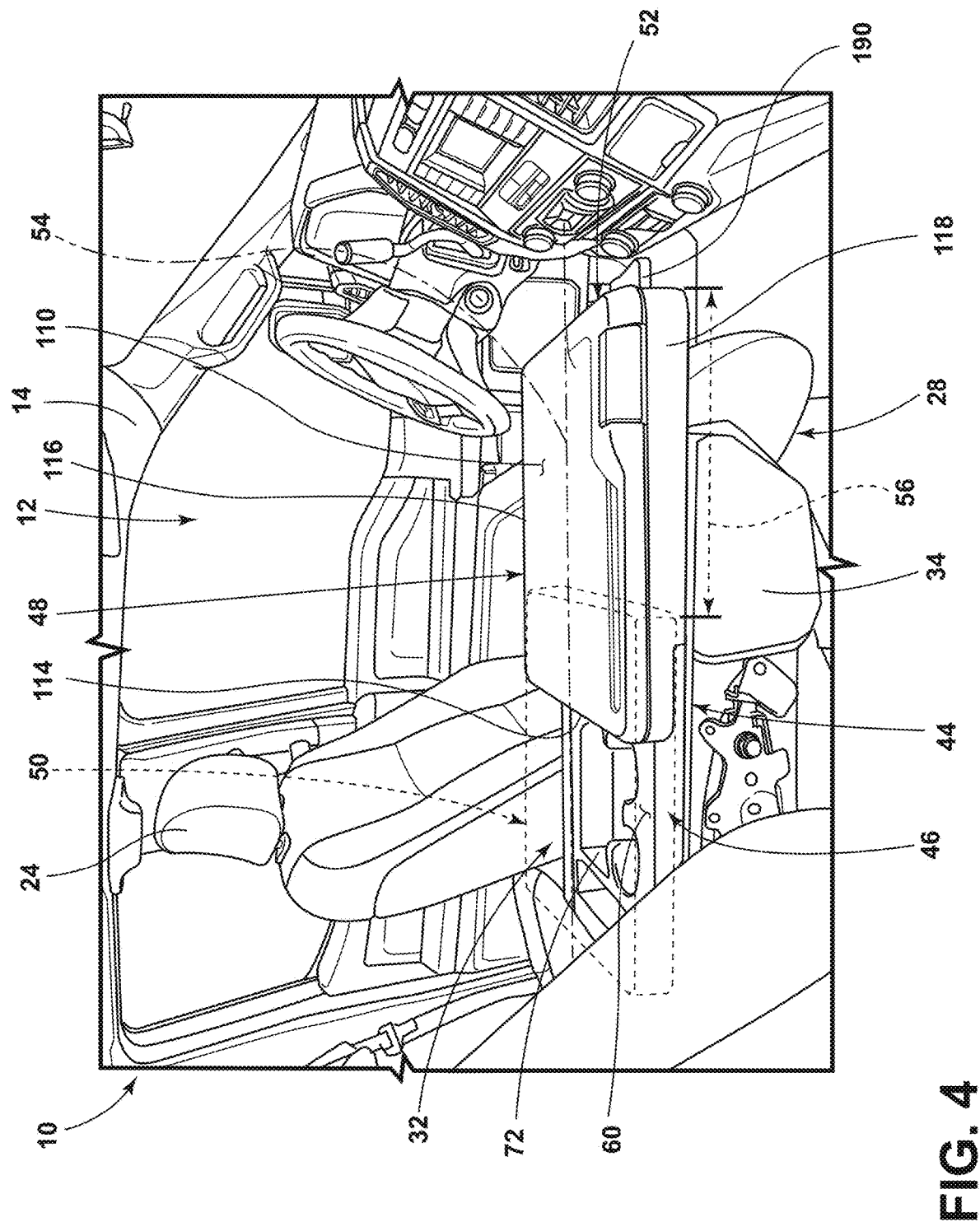
FIG. 4 is a perspective view of the center console of FIG. 3, illustrating the positionable platform having moved to an extreme forward position.
Figure 5:
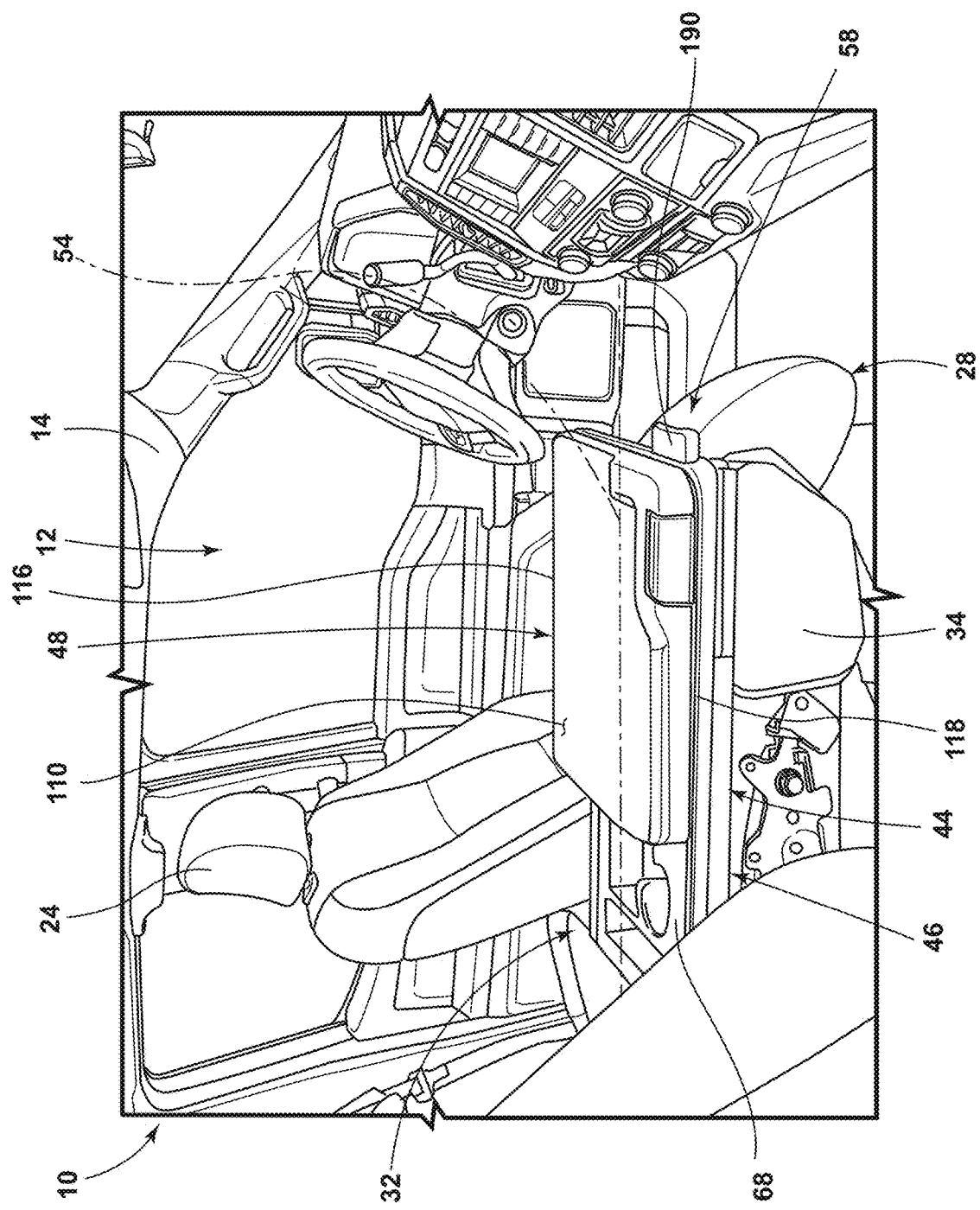
FIG. 5 is a perspective view of the center console of FIG. 3, illustrating the positionable platform having moved to an intermediate position between the extreme forward position and the extreme rearward position.

For purposes of description herein, the terms "upright," "forward," "rearward," "upward," "top," "bottom," "downward," and derivatives thereof, shall relate to the invention as oriented in FIGS. 3-5. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-5, a vehicle 10 includes an interior 12. The vehicle 10 further includes a frame 14 that in part separates the interior 12 from an exterior 16, within which the vehicle 10 is disposed. The vehicle 10 further includes doors 18 that allow a user to selectively access the interior 12. The vehicle 10 further includes a first row of seating 20 within the interior 12. In the illustrated embodiment, the vehicle 10 includes a second row of seating 22 disposed rearward of the first row of seating 20. The first row of seating 20 includes a first lateral seating assembly 24, a second lateral seating assembly 26, and a center seating assembly 28 disposed between the first lateral seating assembly 24 and the second lateral seating assembly 26. An operator of the vehicle 10 can sit in the first lateral seating assembly 24, and a non-operating passenger can sit in the second lateral seating assembly 26, although the seating assignments can be reversed. In the illustrated embodiment, the vehicle 10 is a truck. However, in other embodiments, the vehicle 10 is a car, a van, a sport utility vehicle, and the like.

The center seating assembly 28 can move to and from an upright position 30 (FIG. 2) and a folded position 32 (FIG. 3). The center seating assembly 28 includes a seatback 34 and a seat 36. Another passenger of the vehicle 10 can occupy the center seating assembly 28, when the center seating assembly 28 is in the upright position 30. The seatback 34 includes a forward portion 38, which generally faces forward when the center seating assembly 28 is in the upright position 30. The center seating assembly 28 includes a rear portion 40, which generally faces rearward toward the second row of seating 22 when the center seating assembly 28 is in the upright position 30. The seat 36 includes a top portion 42, which faces generally upward. The seatback 34 can be pivoted forward relative to the seat 36. When the center seating assembly 28 takes the folded position 32, the seatback 34 is rotated forward and the forward portion 38 of the seatback 34 faces the top portion 42 of the seat 36. When the center seating assembly 28 is in the folded position 32, the rear portion 40 of the seatback 34 reveals a center console 44 that is disposed between the first lateral seating assembly 24 and the second lateral seating assembly 26.

The center console 44 includes a base 46 and a positionable platform 48. The base 46 is attached to the seatback 34. The positionable platform 48 is positionable, relative to the base 46, to, from, and between an extreme rearward position 50 (FIG. 3) and an extreme forward position 52 (FIG. 4). The positionable platform 48 is so positionable along a forward and rearward axis of movement 54 relative to the vehicle 10. The extreme rearward position 50 and the extreme forward position 52 are separated by a distance 56. In other words, any point on the positionable platform 48 is displaced by the distance 56 parallel to the axis of movement 54 between the extreme rearward position 50 and the extreme forward position 52. In embodiments, the distance 56 is between 100 mm and 400 mm, such as between 200 mm and 300 mm, such as between 250 mm and 300 mm, such as approximately 290 mm. As will be detailed further below, in an embodiment, the positionable platform 48 is positionable to at least one intermediate position 58 (FIG. 5) between the extreme rearward position 50 and the extreme forward position 52. In embodiments, the positionable platform 48 is positionable to between 1 and 15 intermediate positions between the extreme rearward position 50 and the extreme forward position 52, such as between 5 and 15 intermediate positions, such as between 8 and 12 intermediate positions, such as 10 intermediate positions.

Figure 6:
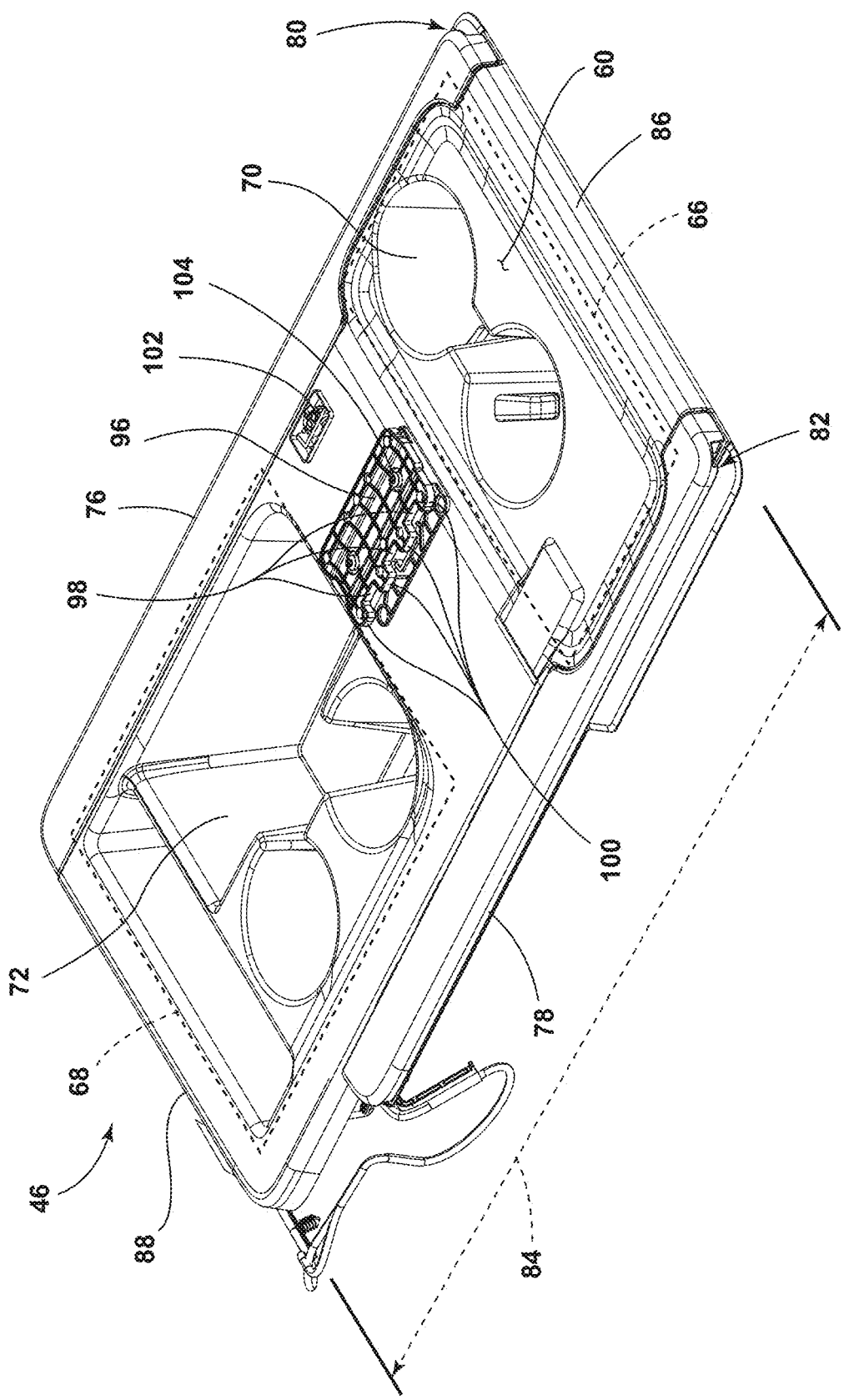
FIG. 6 is a top perspective view of the base of FIG. 3, illustrating an anchor having alternating projections and recesses, as well as a first elongated rail and a second elongated rail extending along a length of the base.
Figure 7:
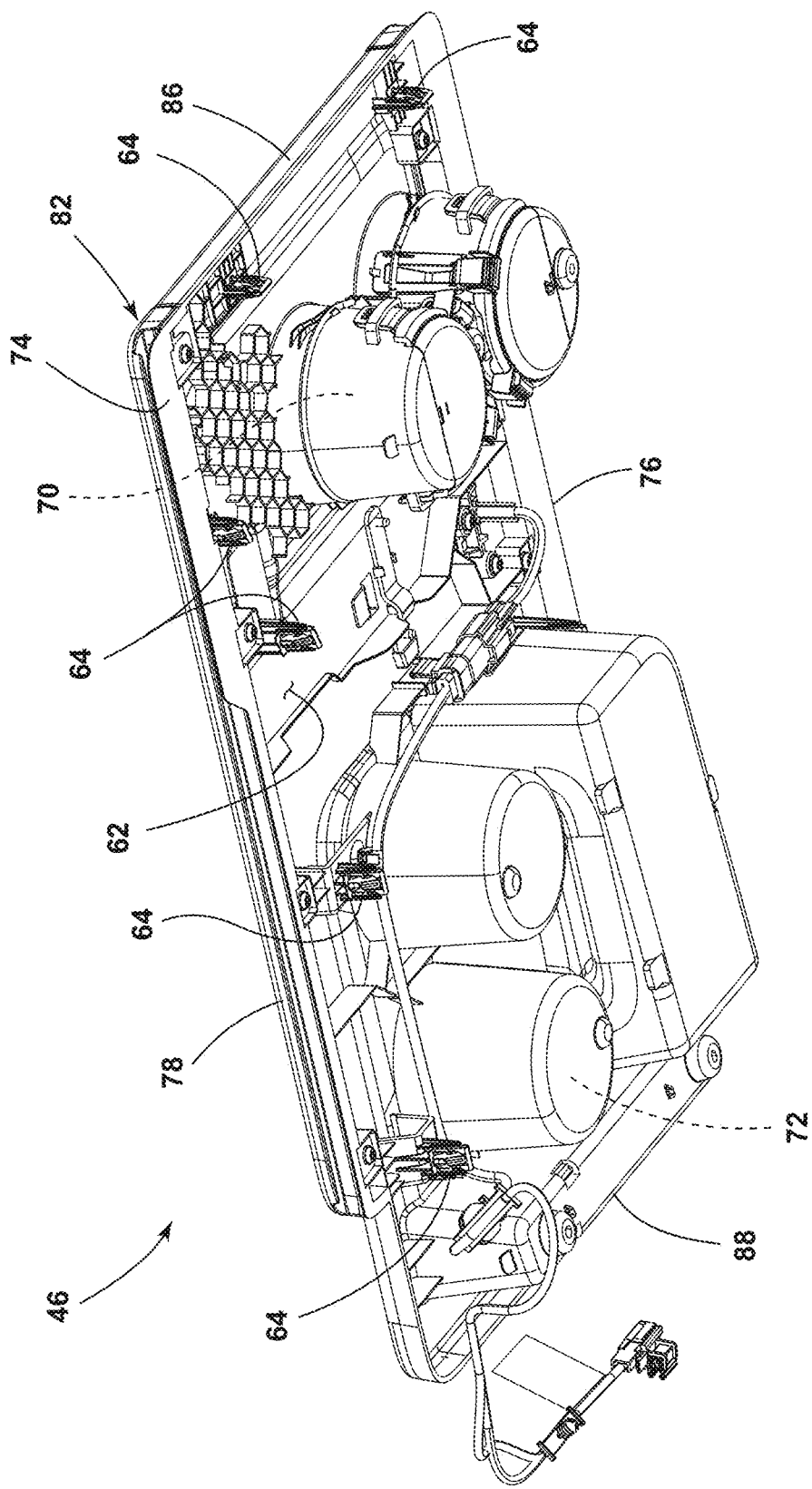
FIG. 7 is a bottom perspective view of the base of FIG. 3.
Figure 8:
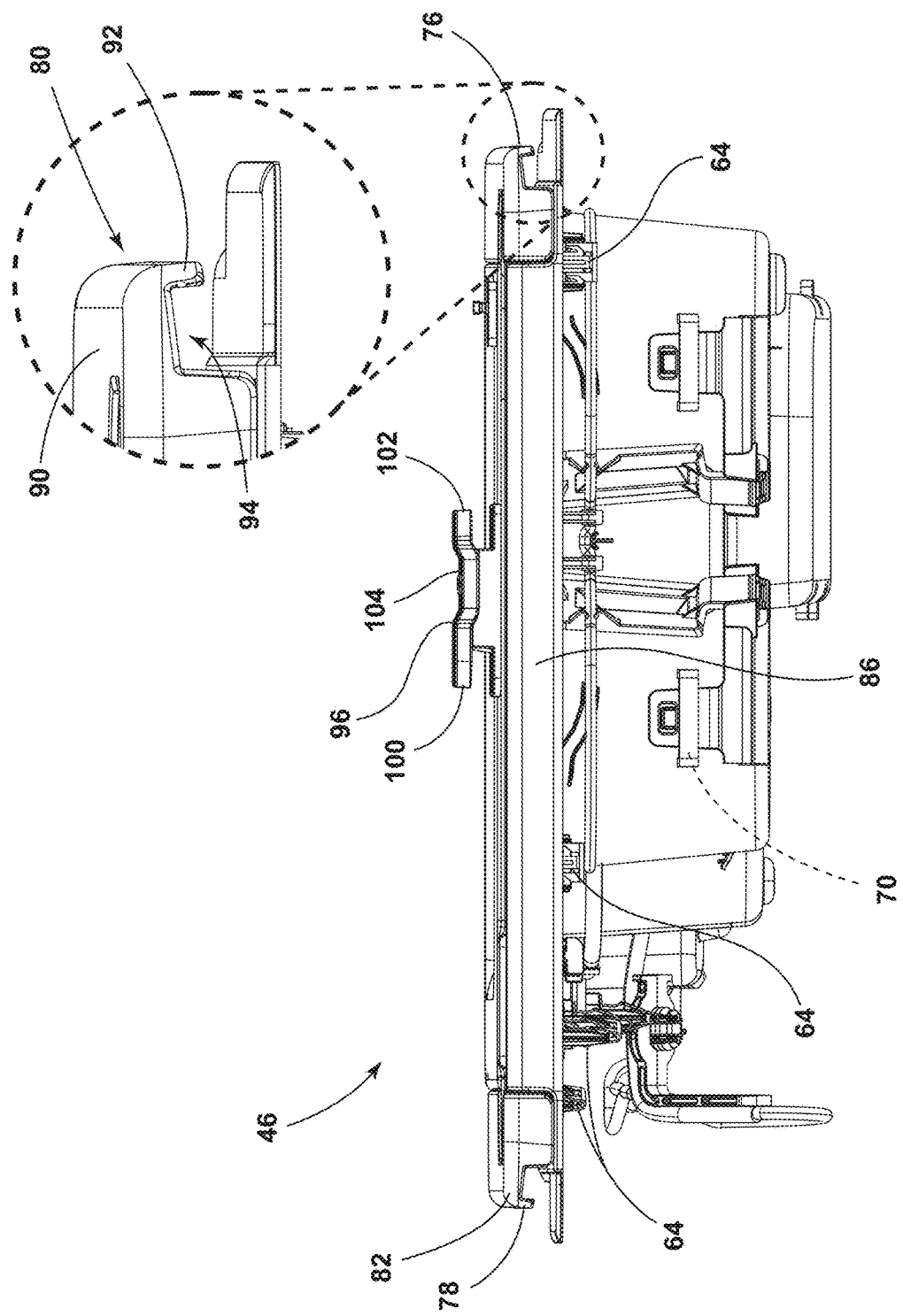
FIG. 8 is a side view of the base of FIG. 3, illustrating a wing of the anchor and the projections extending in opposite directions from a central platform, and illustrating each elongated rail having an outwardly extending portion and a downward extending portion that form a C-channel.

Referring now additionally to FIGS. 6-8, the base 46 includes a top surface 60 and a bottom surface 62 on the other side of the base 46 as the top surface 60. The top surface 60 faces generally upward when the seatback 34 is in the folded position 32. The bottom surface 62 faces generally downward when the seatback 34 is in the folded position 32. The base 46 includes fasteners 64 that fasten the base 46 to the seatback 34.

In the illustrated embodiment, the top surface 60 of the base 46 has a forward region 66 and a rear region 68, which is located rearward (closer to the second row of seating 22) than the forward region 66. When the positionable platform 48 is in the extreme rearward position 50 (FIG. 3), the positionable platform 48 covers the rear region 68 but does not cover the forward region 66, leaving the forward region 66 open to the interior 12 and accessible by an occupant of the vehicle 10. The forward region 66 can, as in the illustrated embodiment, provide access to a storage area 70 such as to hold cups and the like. When the positionable platform 48 is in the extreme forward position 52 (FIG. 4), the positionable platform 48 covers and thereby denies access to the forward region 66 but does not cover and provides access to the rear region 68. The rear region 68 can, as in the illustrated embodiment, provide access to another storage area 72 such as to hold cups, money, and the like. The bottom surface 62 of the base 46 includes a perimeter 74 that lies flush with the rear portion 40 of the seatback 34. Accordingly, the storage areas 70, 72 provided from the top surface 60 extend into an interior region of the seatback 34 between the forward portion 38 and the rear portion 40 of the seatback 34.

The base 46 further includes a first lateral side 76 and a second lateral side 78 on the opposite side of the base 46 as the first lateral side 76. The first lateral side 76 faces away from the axis of movement 54 in the general direction of the first lateral seating assembly 24, while the second lateral side 78 faces away from the axis of movement 54 in the general direction of the second lateral seating assembly 26.

The base 46 further includes a pair of elongated rails 80, 82, that is, a first elongated rail 80 disposed at the first lateral side 76, and a second elongated rail 82 disposed at the second lateral side 78. Both the first elongated rail 80 and the second elongated rail 82 extend along a significant portion of a length 84 of the base 46 from a forward edge 86 to a rear edge 88 of the base 46. The pair of elongated rails 80, 82, extend at least approximately parallel to the axis of movement 54 of the positionable platform 48. The pair of elongated rails 80, 82, as will be explained further below, allow the positionable platform 48 to couple to the base 46 but also allow the positionable platform 48 to move to, from, and between the extreme rearward position 50, the extreme forward position 52, and the at least one intermediate position 58. In the illustrated embodiment, each of the pair of elongated rails 80, 82 includes an outward laterally extending portion 90 and a downward extending portion 92 that together form a C-channel 94. In other embodiments, instead of being disposed at the first lateral side 76 and the second lateral side 78, the pair of elongated rails 80, 82 are elevated above the top surface 60 of the base 46.

The base 46 further includes an anchor 96. The anchor 96, as will be further explained below, interacts with a releasable locking mechanism of the positionable platform 48 to maintain the positionable platform 48 in the extreme forward position 52, the extreme rearward position 50, or the at least one intermediate position 58, unless the releasable locking mechanism is released. In the illustrated embodiment, the anchor 96 is disposed laterally between the pair of elongated rails 80, 82, but the anchor 96 need not be so disposed. In other embodiments, the pair of elongated rails 80, 82 is elevated above or recessed below the top surface 60 of the base 46, and the anchor 96 is disposed laterally closer to the first lateral side 76 or the second lateral side 78 of the base 46 than the pair of elongated rails 80, 82.

The anchor 96 includes alternating recesses 98 and projections 100. The alternating recesses 98 and projections 100 interact with the releasable locking mechanism of the positionable platform 48, as detailed below. In the illustrated embodiment, the plurality of projections 100 project laterally toward the second lateral side 78 of the base 46. In the illustrated embodiment, the alternating recesses 98 and projections 100 are, along with a wing 102, elevated above the top surface 60 of the base 46 by a central platform 104. The wing 102 projects from the central platform 104 to the first lateral side 76 of the base 46. The wing 102 and the alternating recesses 98 and projections 100 run along a portion the length 84 of the base 46.

Figure 9:
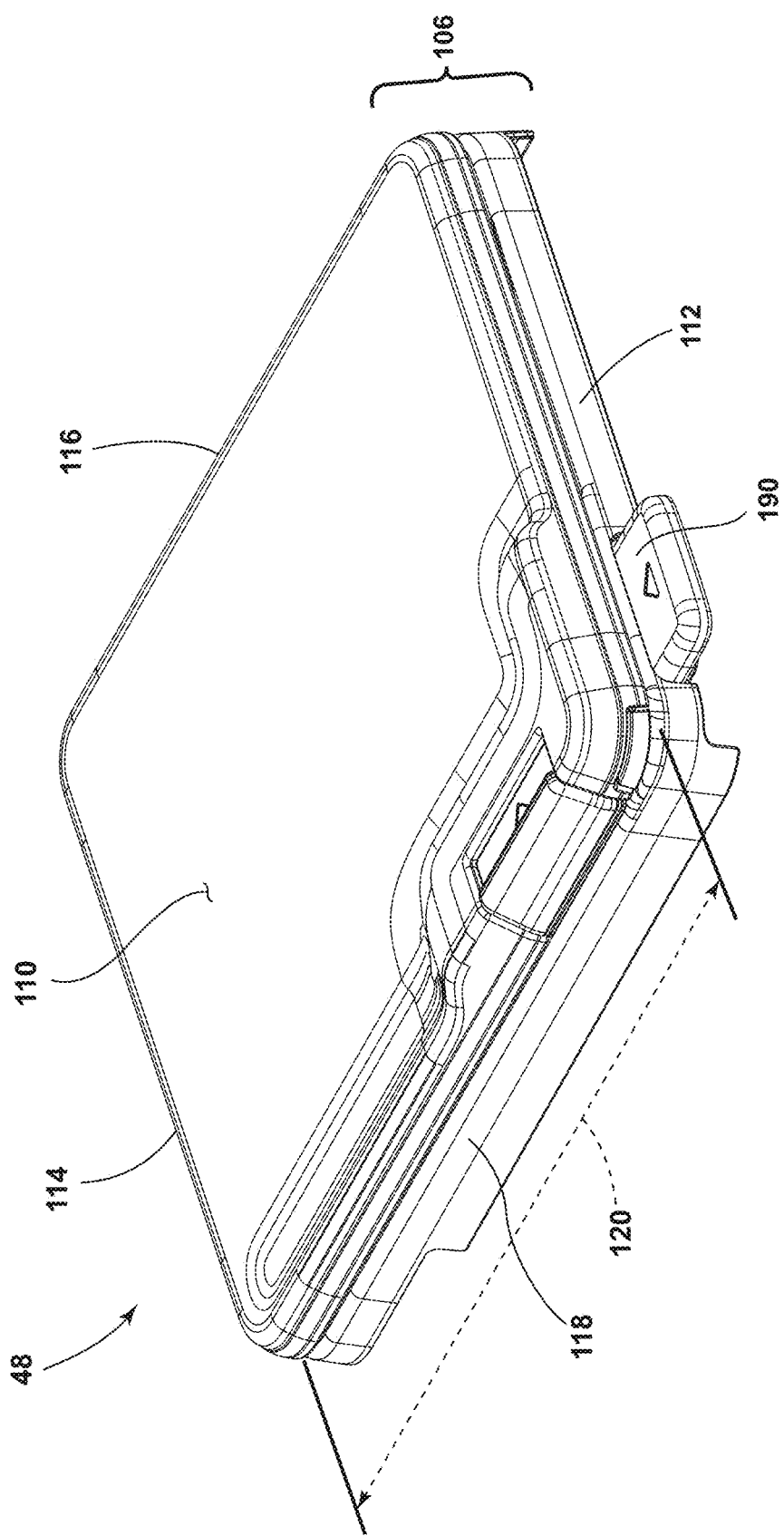
FIG. 9 is a top perspective view of the positionable platform of FIG. 3, illustrating a top housing assembly providing a relatively planar top surface.
Figure 10:
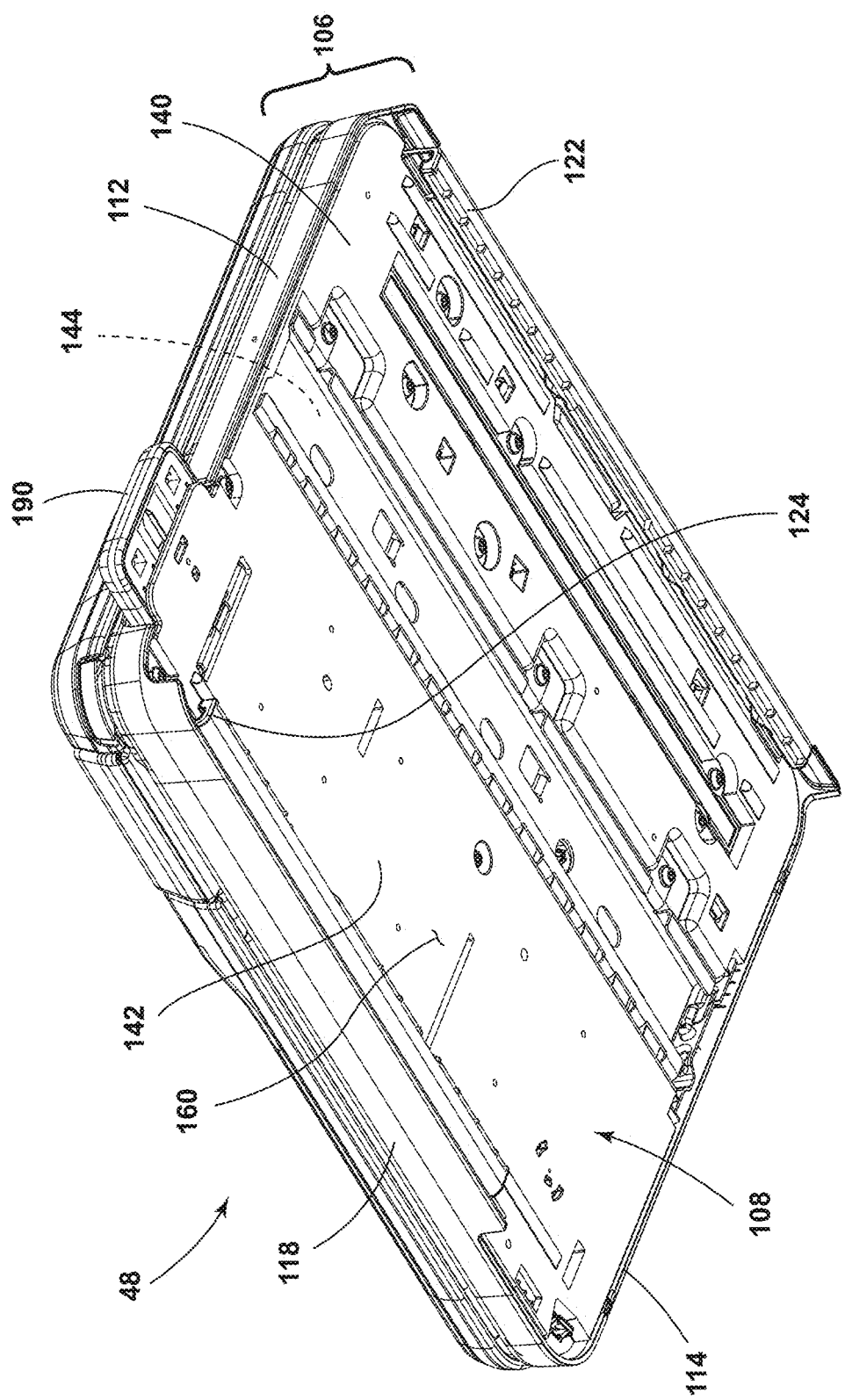
FIG. 10 is a bottom perspective view of the positionable platform of FIG. 3, illustrating a bottom housing below the top housing assembly, and illustrating a first track and a second track extending along sides of the positionable platform.
Figure 11:
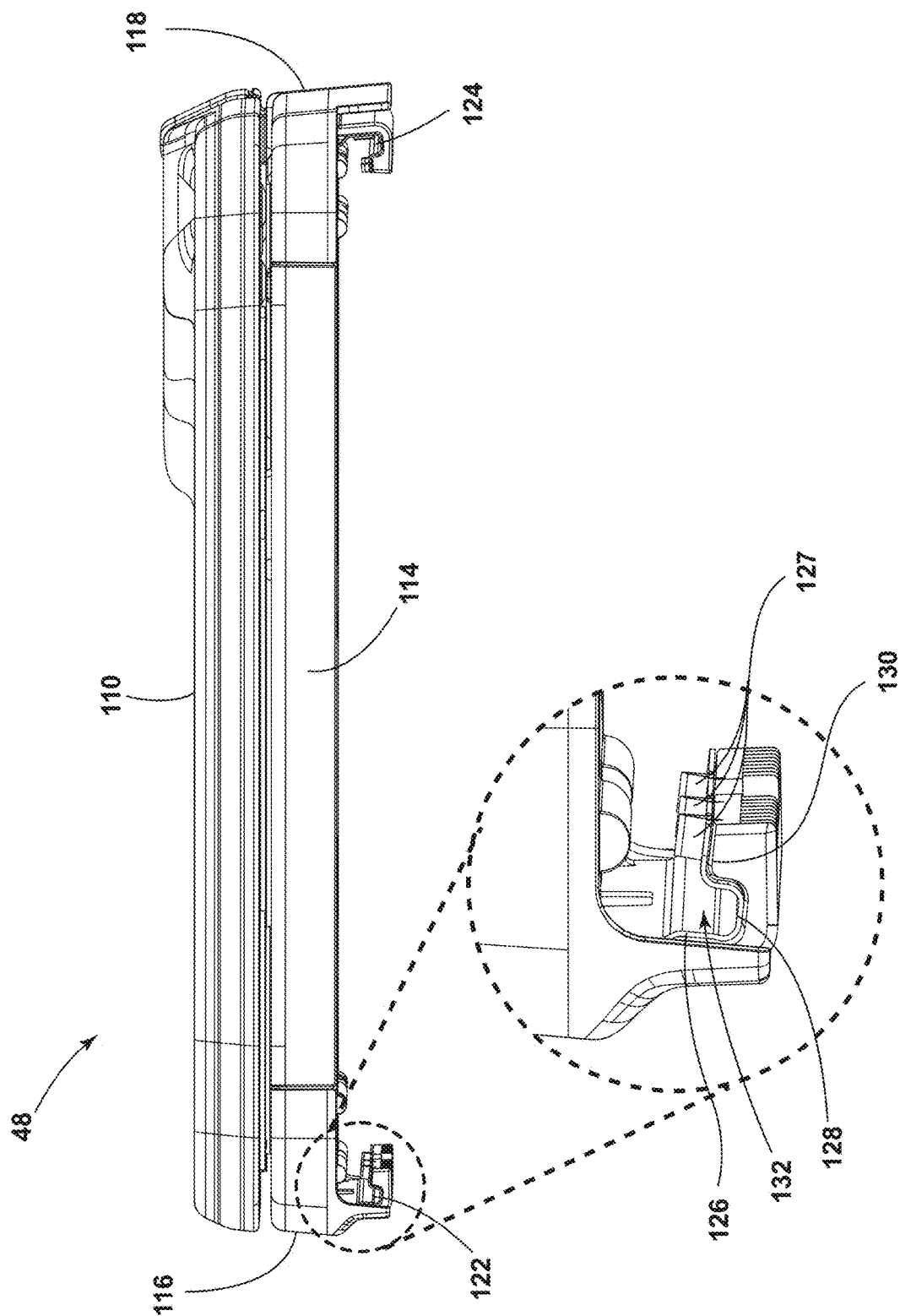
FIG. 11 is a rear view of the positionable platform of FIG. 3, illustrating each of the first track and the second track having a downward extending portion, an inward extending portion, and an upward extending portion forming a C-channel.

Referring now to FIGS. 9-10, the positionable platform 48 includes a top housing assembly 106 and a bottom housing 108. The top housing assembly 106 and the bottom housing 108 house, between them, the releasable locking mechanism that interacts with the anchor 96 of the base 46, as discussed below. The top housing assembly 106 provides a top surface 110, a forward side 112, a rear side 114, a first lateral side 116, and a second lateral side 118. The bottom housing 108 is nested within the top housing assembly 106.

The top surface 110 of the top housing assembly 106 is substantially planar. The substantially planar nature of the top surface 110 of the positionable platform 48 allows the positionable platform 48 to support paper for writing, a laptop computer, a meal, and so on. The top surface 110 faces generally upward and is generally parallel with the top surface 60 of the base 46. The forward side 112 is the most forward portion of the positionable platform 48 and faces generally forward. The rear side 114 is the most rearward portion of the positionable platform 48 and faces generally rearward. The positionable platform 48 has a length 120 defined as the distance between the forward side 112 and the rear side 114 that is parallel to the axis of movement 54 of the positionable platform 48. The first lateral side 116 faces in the general direction of the first lateral seating assembly 24. The second lateral side 118 faces in the general direction of the second lateral seating assembly 26. When the positionable platform 48 is the extreme rearward position 50, the rear side 114 of the positionable platform 48 and the rear edge 88 of the base 46 are at least approximately flush. In the illustrated embodiment, the length 120 of the positionable platform 48 is less than the length 84 of the base 46, which permits the forward region 66 of the base 46 to be accessible from the interior 12 when the positionable platform 48 is in the extreme rearward position 50.

The positionable platform 48 further includes a pair of elongated tracks 122, 124, that is, a first track 122 and a second track 124. Each of the pair of elongated tracks 122, 124 cooperate with one of the pair of elongated rails 80, 82 of the base 46. That is, the first track 122 cooperates with the first rail 80 of the base 46, and the second track 124 cooperates with the second rail 82 of the base 46. The location of the pair of elongated tracks 122, 124 on the positionable platform 48 and the location of the pair of elongated rails 80, 82 of the base 46 are a function of each other, as the locations enable the cooperating relationship.

In the illustrated embodiment, the first track 122 is disposed adjacent to, and just inboard of the first lateral side 116, and the second track 124 is disposed adjacent to the second lateral side 118. Each of the first track 122 and the second track 124 include a downward extending portion 126, an inward extending portion 128 extending inward from the downward extending portion 126, and an upward extending portion 130 extending upward from the inward extending portion 128, thus forming a C-channel 132. Each of the first track 122 and the second track 124 include rollers 127 disposed at the upward extending portion 130.

Figure 12:
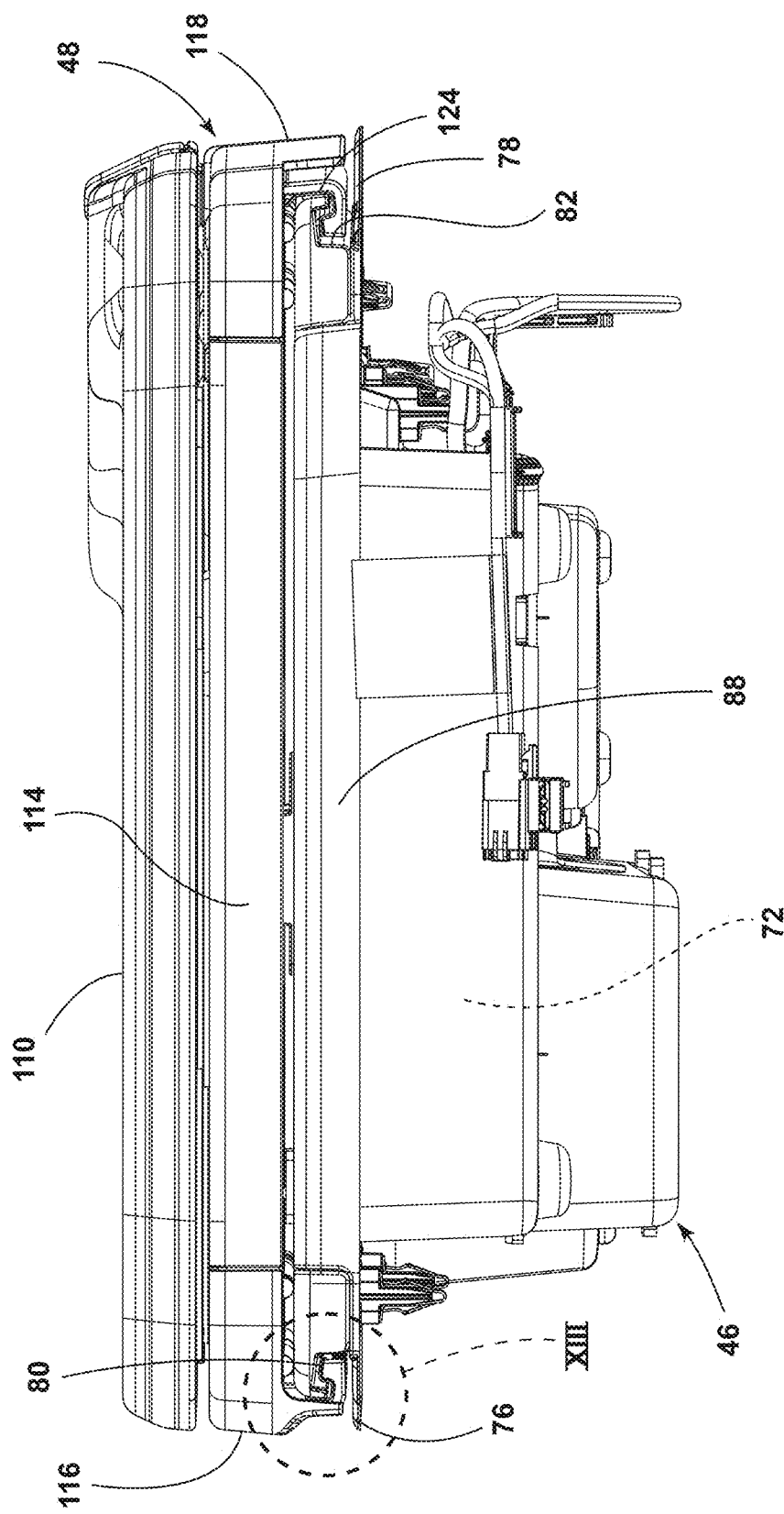
FIG. 12 is a rear view of the positionable platform of FIG. 3 coupled to the base of FIG. 3, illustrating the first elongated rail of the base cooperating with the first track of the positionable platform, and the second elongated rail of the base cooperating with the second track of the positionable platform.
Figure 13:
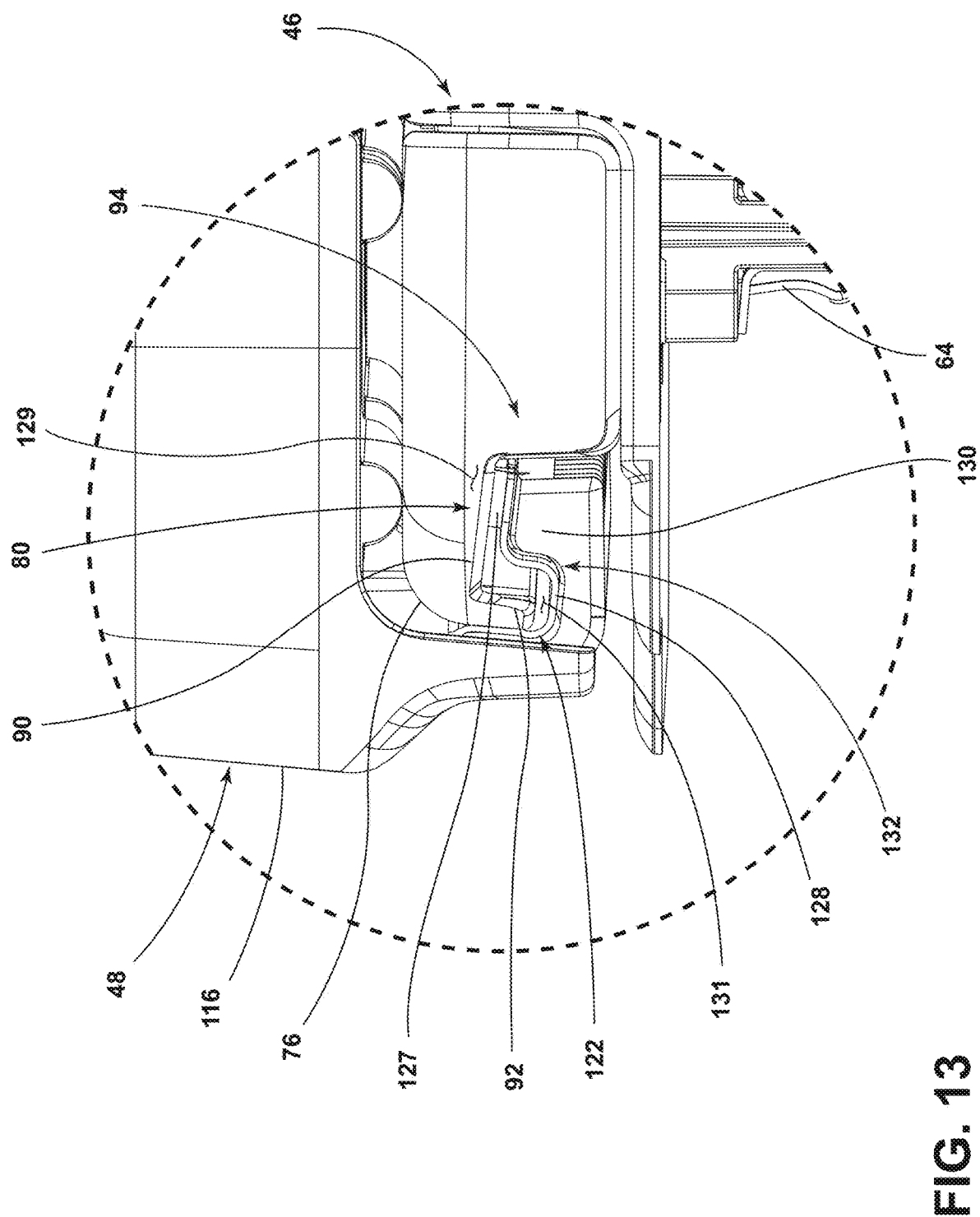
FIG. 13 is a magnified view of area XIII of FIG. 12, illustrating that the outwardly extending portion of the first elongated rail is disposed above the upward extending portion of the first track, which is disposed within the C-channel of the first elongated rail.

Referring now additionally to FIGS. 12 and 13, the upward extending portion 130 of the first track 122 lies within the C-channel 94 of the first elongated rail 80. The rollers 127 of the first track 122 contact a bottom surface 129 of the outwardly extending portion 90 of the first elongated rail 80. The downward extending portion 92 of the first elongated rail 80 lies within the C-channel 132 of the first track 122 and above a top surface 131 of the inward extending portion 128. The downward extending portion 126 of the first track 122 is disposed laterally outward of the downward extending portion 92 of the first elongated rail 80. Likewise, the downward extending portion (not separately illustrated) of the second track 124 is disposed laterally outward of the downward extending portion (not separately illustrated) of the second elongated rail 82. The first track 122 and the second track 124 of the positionable platform 48 partially wrap around the first elongated rail 80 and the second elongated rail 82, respectively, of the base 46. The pair of elongated tracks 122, 124 cooperate with the pair of elongated rails 80, 82 of the base 46 in this manner as the positionable platform 48 is positioned relative to the base 46 to, from, and between the extreme rearward position 50 and the extreme forward position 52.

Figure 14:
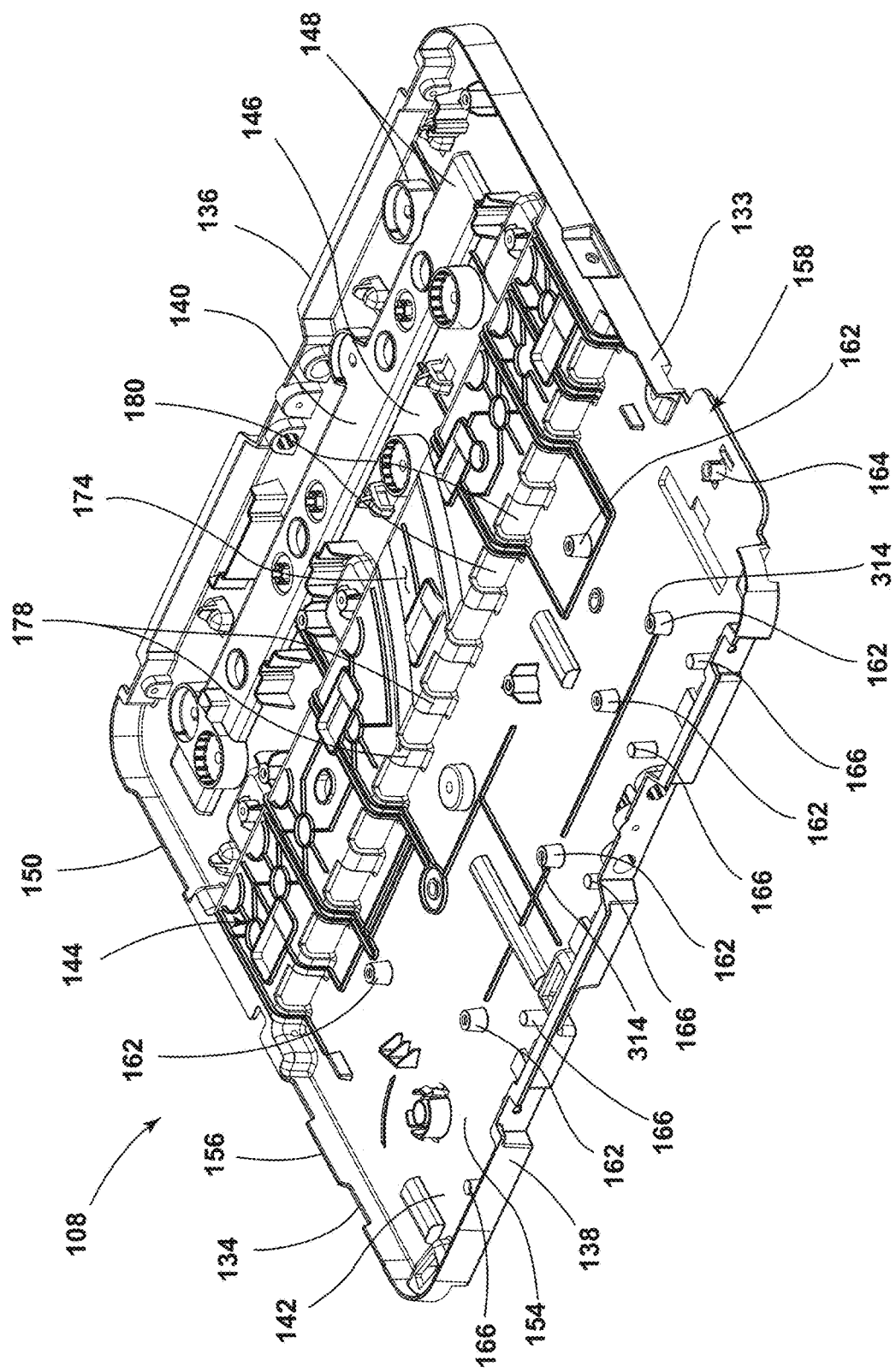
FIG. 14 is a top perspective view of the bottom housing of FIG. 10, illustrating a channel region disposed between a first region and a second region.
Figure 15:
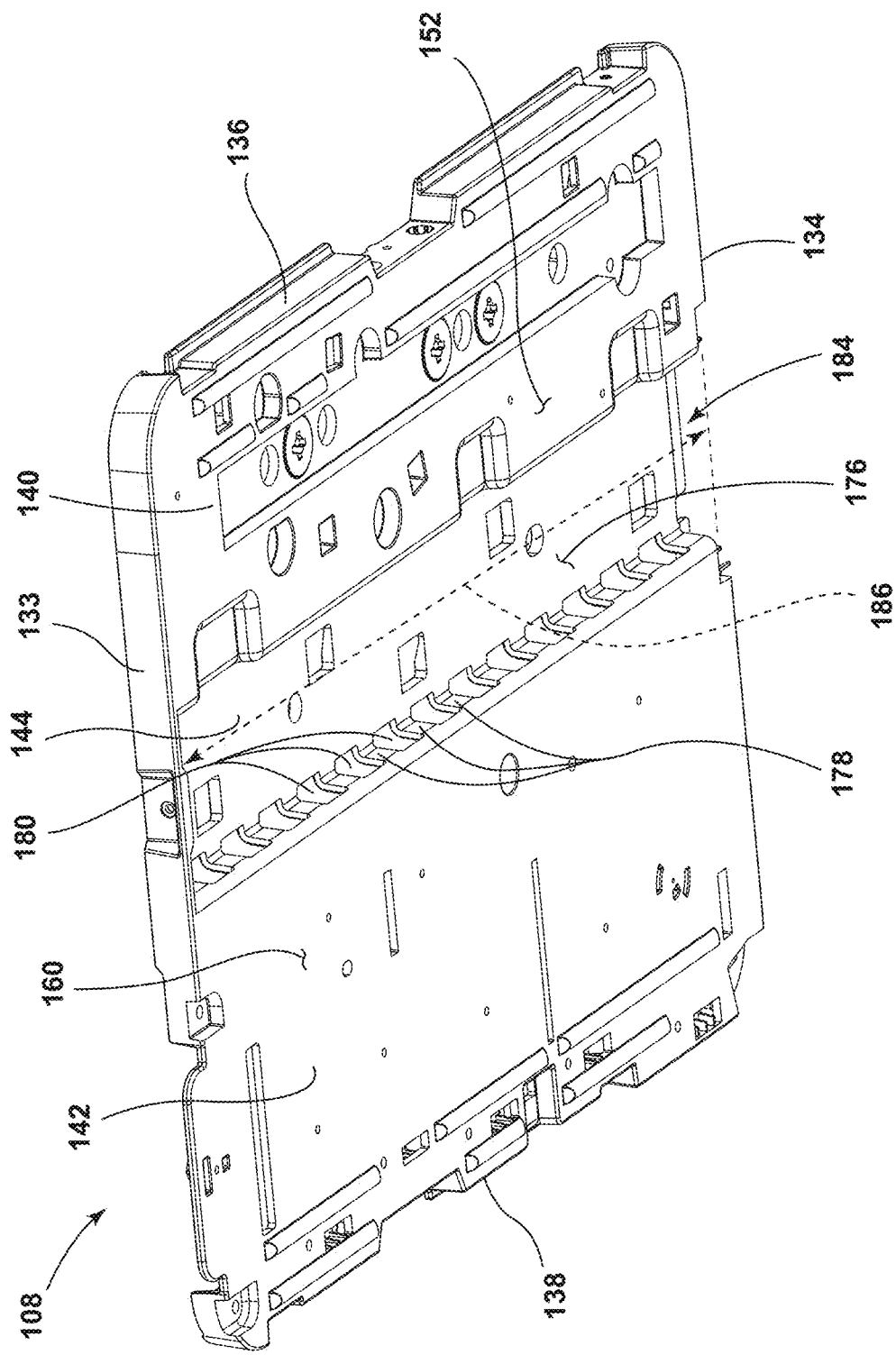
FIG. 15 is a bottom perspective view of the bottom housing of FIG. 10, illustrating a channel extending a length, with alternating spaced walls and slots transitioning between the channel region and the second region.
Figure 16:
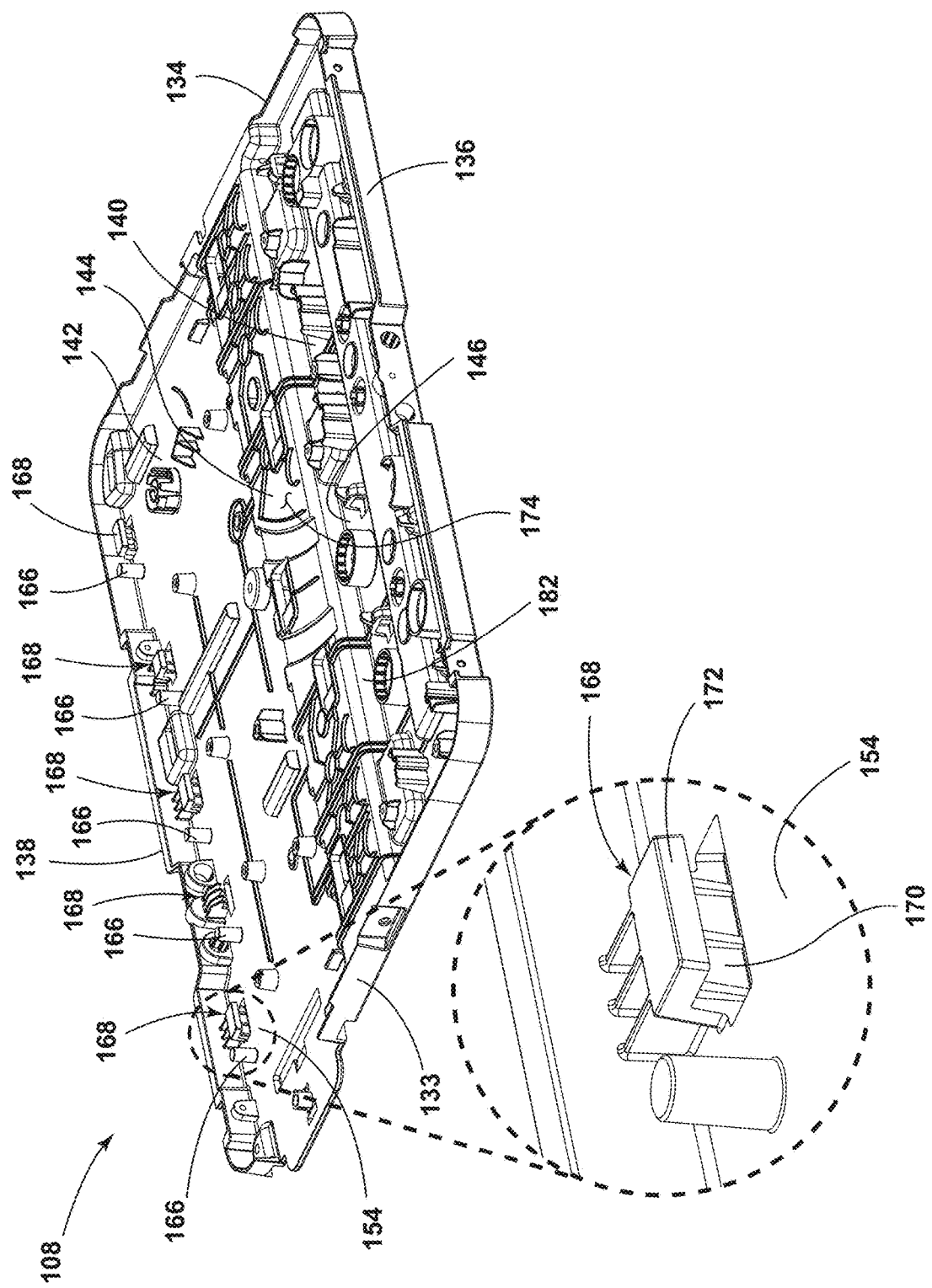
FIG. 16 is another top perspective view of the bottom housing of FIG. 10, illustrating a vertical wall transitioning between a top surface of the channel region and a floor of the first region, and illustrating spring receivers in the second region having a vertical wall between the floor and a lateral tab.

Referring now additionally to FIGS. 14-16, the bottom housing 108 of the positionable platform 48 includes a forward side 133, a rear side 134, a first lateral side 136, and a second lateral side 138. The forward side 133 faces forward, the rear side 134 faces rearward, the first lateral side 136 faces in the general direction of the first lateral seating assembly 24, and the second lateral side 138 faces in the general direction of the second lateral seating assembly 26.

The bottom housing 108 further includes a first region 140 adjacent to the first lateral side 136, a second region 142 adjacent the second lateral side 138, and a channel region 144 between the first region 140 and the second region 142. All of the first region 140, the second region 142, and the channel region 144 extend from the forward side 133 to the rear side 134.

The first region 140 includes a floor 146 adjacent to the channel region 144 that faces generally upward. A variety of projections 148 can extend upward from the floor 146. A lip 150 extends upward from the floor 146, and extends around a partial perimeter of the first region 140 from the rear side 134, along the first lateral side 136, and along the forward side 133. The first region 140 further includes a bottom surface 152 that faces generally downward.

The second region 142 has a floor 154, which is relatively and essentially coplanar with the floor 146 of the first region 140. A lip 156 extends upward from the floor 154 and extends along a partial perimeter of the second region 142 from the rear side 134, along the second lateral side 138, and along the forward side 133 except for a mouth 158 to the floor 154 of the second region 142. In addition, the second region 142 has a bottom surface 160, which faces generally downward, is relatively planar, is relatively parallel to the floor 154, and is generally coplanar with the bottom surface 152 of the first region 140.

The second region 142 further includes a first group of projections 162, which extend upward from the floor 154. As will be explained below, the first group of projections 162 help guide the movement of a first bracket and a second bracket of the releasable locking mechanism. The second region 142 further includes a projection 164 extending upward from the floor 154 near the mouth 158 that helps guide the movement of the first bracket. The second region 142 further includes a second group of projections 166 extending upward from the floor 154. Each of the second group of projections 166 is operably coupled to a spring of the releasable locking mechanism, as described below. The second group of projections 166 are disposed adjacent to the lip 150 at the second lateral side 138, and are disposed further from the channel region 144 than the first group of projections 162. The second region 142 further includes spring receivers 168, one spring receiver to receive each of the springs of the releasable locking mechanism. Each spring receiver 168 is an L-shaped component that includes a vertical wall 170 that extends upward relative to the floor 154, and a lateral tab 172 extending toward the channel region 144 from the vertical wall 170.

The channel region 144 has a top surface 174 that faces generally upward, and a bottom surface 176 that faces generally downward and is relatively parallel to the top surface 174. Both the top surface 174 and the bottom surface 176 of the channel region 144 are elevated above the floors 146, 154 of the first region 140 and the second region 142, respectively. In other words, the top surface 174 of the channel region 144 is disposed closer to the top surface 110 of the top housing assembly 106 than the floors 146, 154. Stated another way, the floors 146, 154 of the first region 140 and the second region 142 are disposed lower than the top surface 174 of the channel region 144. All of the top surface 174, the floor 146, and the floor 154 are at least approximately parallel to the top surface 110 of the top housing assembly 106. A plurality of spaced walls 178 provide the transition between the second region 142 and the channel region 144. The plurality of spaced walls 178 form a plurality of spaced slots 180. In other words, there are alternating walls 178 and slots 180 transitioning between the floor 146 of the second region 142 and the top surface 174 of the channel region 144, and transitioning between the bottom surface 160 of the second region 142 and the bottom surface 176 of the channel region 144. A vertical wall 182 transitions between the top surface 174 of the channel region 144 and the floor 146 of the first region 140, and transitions between the bottom surface 176 of the channel region 144 and the bottom surface 152 of the first region 140. The channel region 144 thus forms a channel 184, which as will be discussed below provides space for the positionable platform 48 to move about the axis of movement 54 with the anchor 96 within the channel 184. The channel 184 has a length 186 parallel to the axis of movement 54 of the positionable platform 48. The length 186 extends from approximately the forward side 133 to the rear side 134 of the bottom housing 108.

Referring now to FIGS. 17-21, the positionable platform 48 further includes a releasable locking mechanism 188. The releasable locking mechanism 188 includes a button 190, a first bracket 192, a second bracket 194, and at least one spring 196. Except for the button 190, the releasable locking mechanism 188 is disposed beneath the top housing assembly 106 of the positionable platform 48. The button 190 is accessible for manipulation by an occupant of the vehicle 10. The occupant of the vehicle 10 can manipulate the button 190 by pushing the button 190 along an axis of movement 304 in a first direction 306, which is parallel to the axis of movement 54 of the positionable platform 48.

Figure 18:
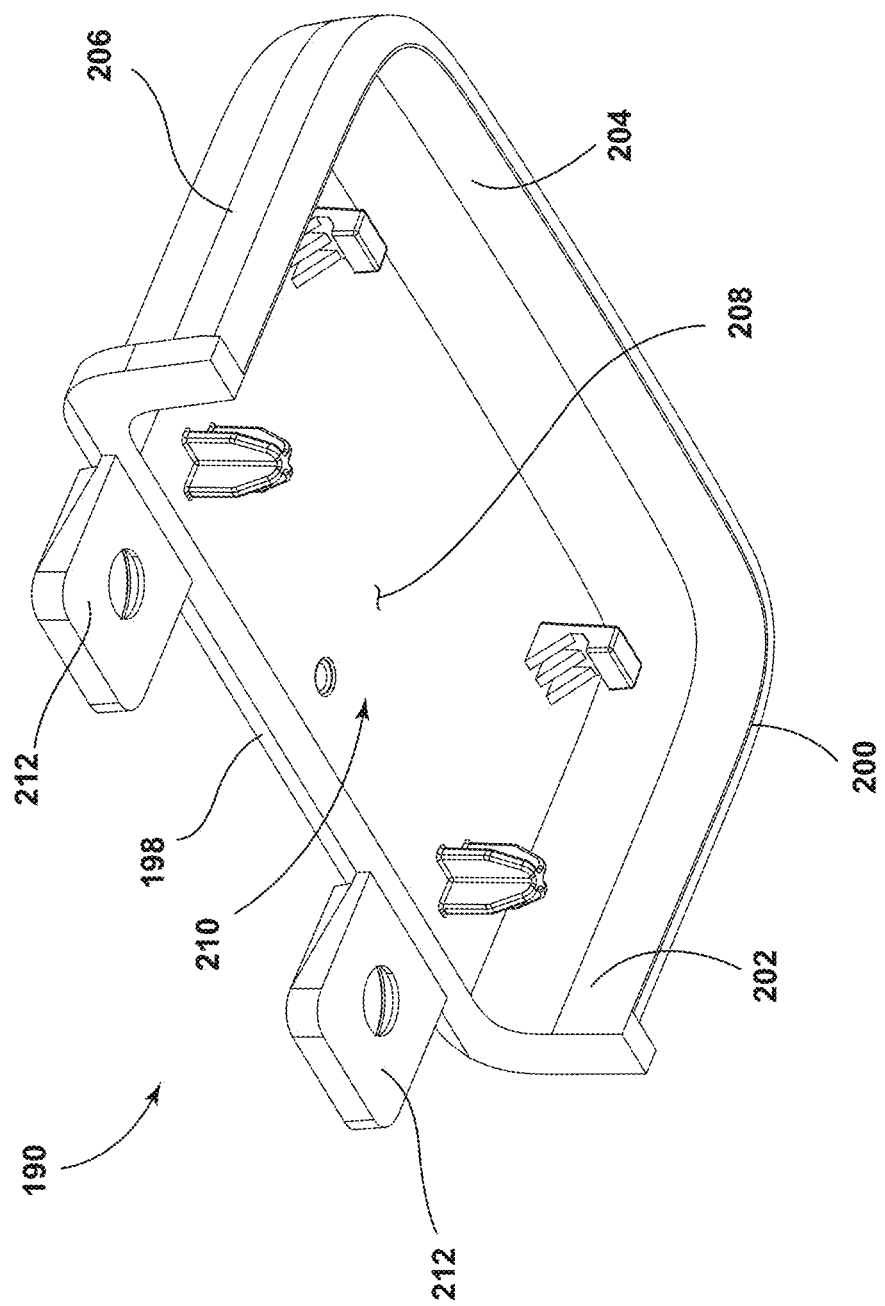
FIG. 18 is a bottom perspective view of the button of FIG. 17, illustrating a top wall and a downward lip that forms a chamber.
Figure 19:
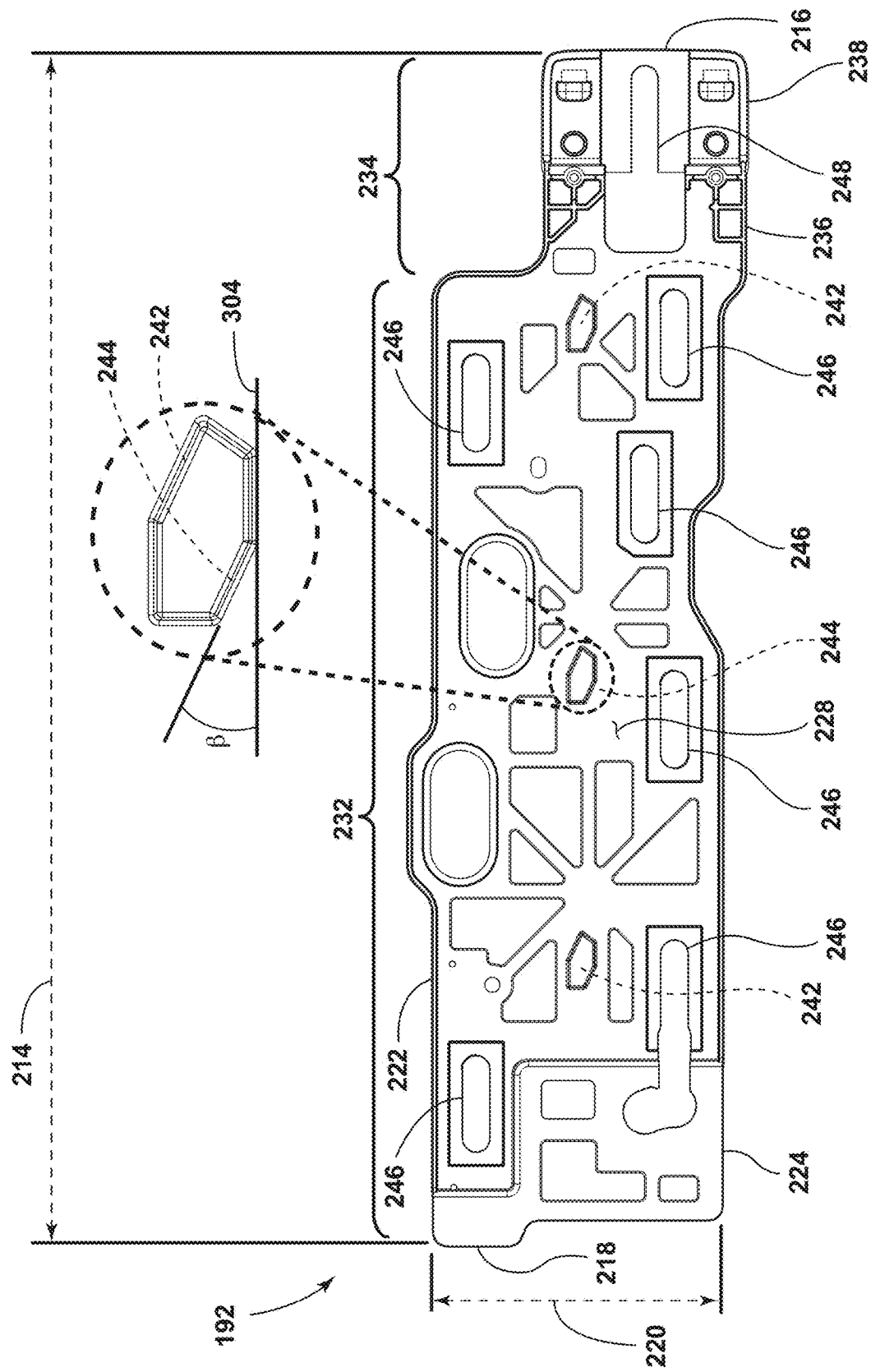
FIG. 19 is a top view of the first bracket of FIG. 17, illustrating an attachment tab to accept the button, and a main body with guides that define the axis of movement of the first bracket.
Figure 20:
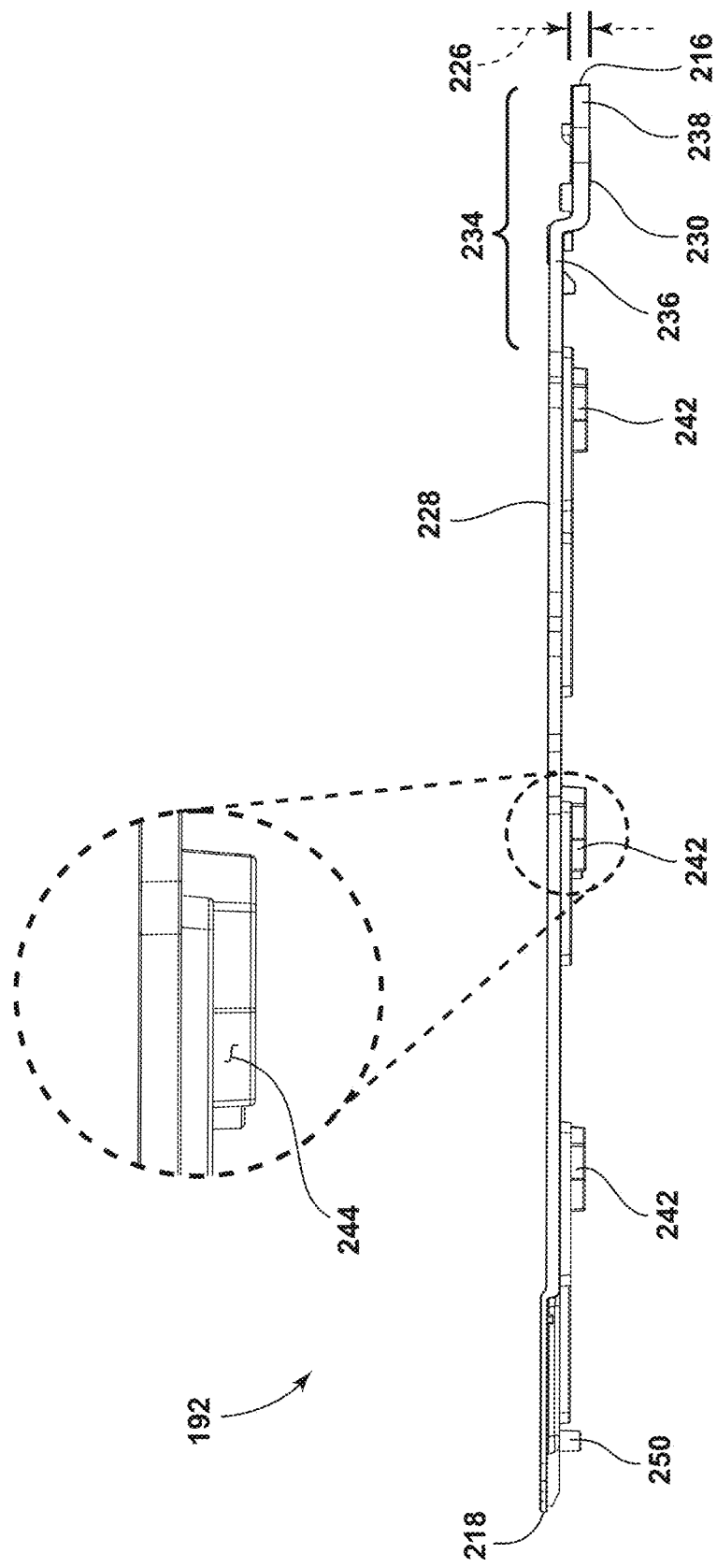
FIG. 20 is an elevational view of the first bracket of FIG. 17, illustrating several projections in the main body that have a contact surface to contact the second bracket of FIG. 17.
Figure 21:
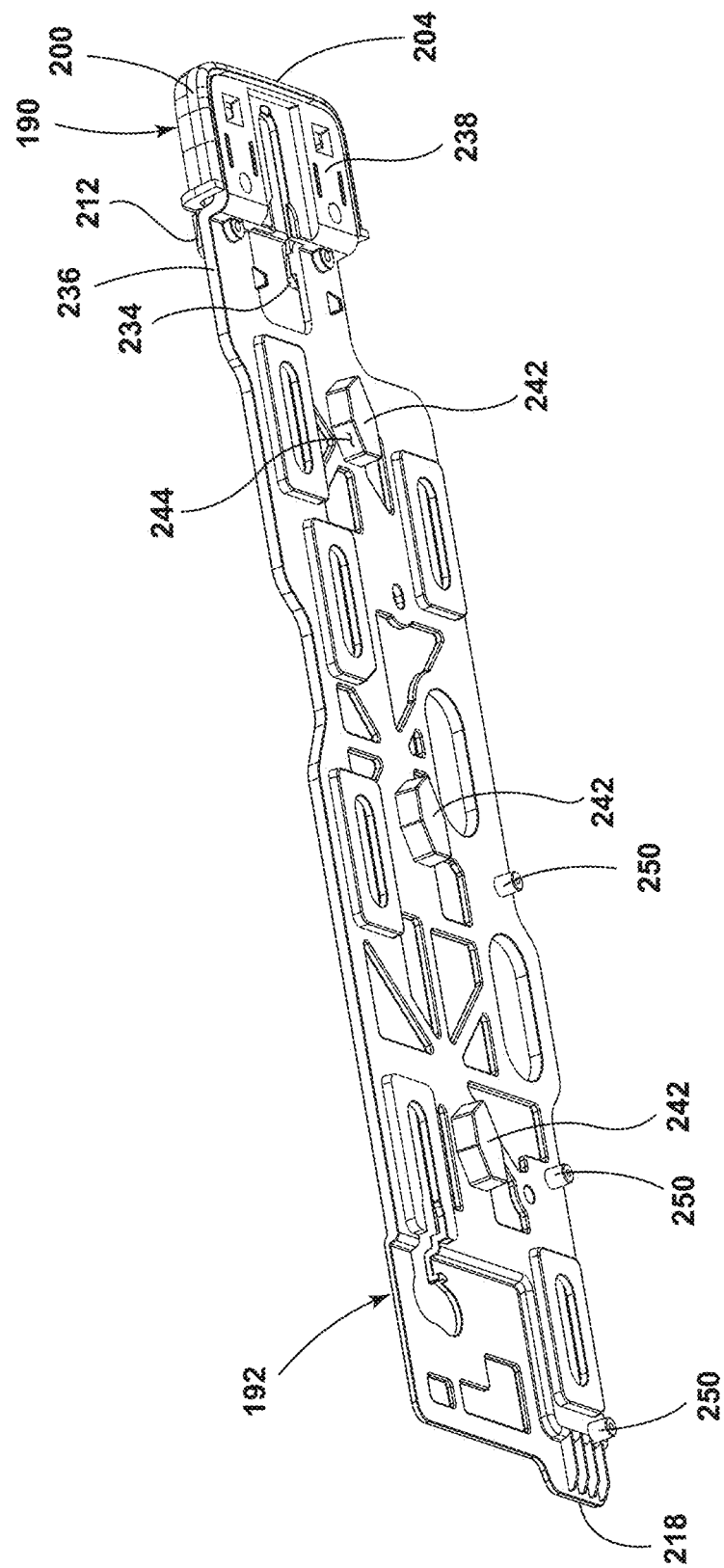
FIG. 21 is a bottom perspective view of the button attached to the attachment tab of the first bracket, illustrating additional projections that extend downward.
Figure 22:
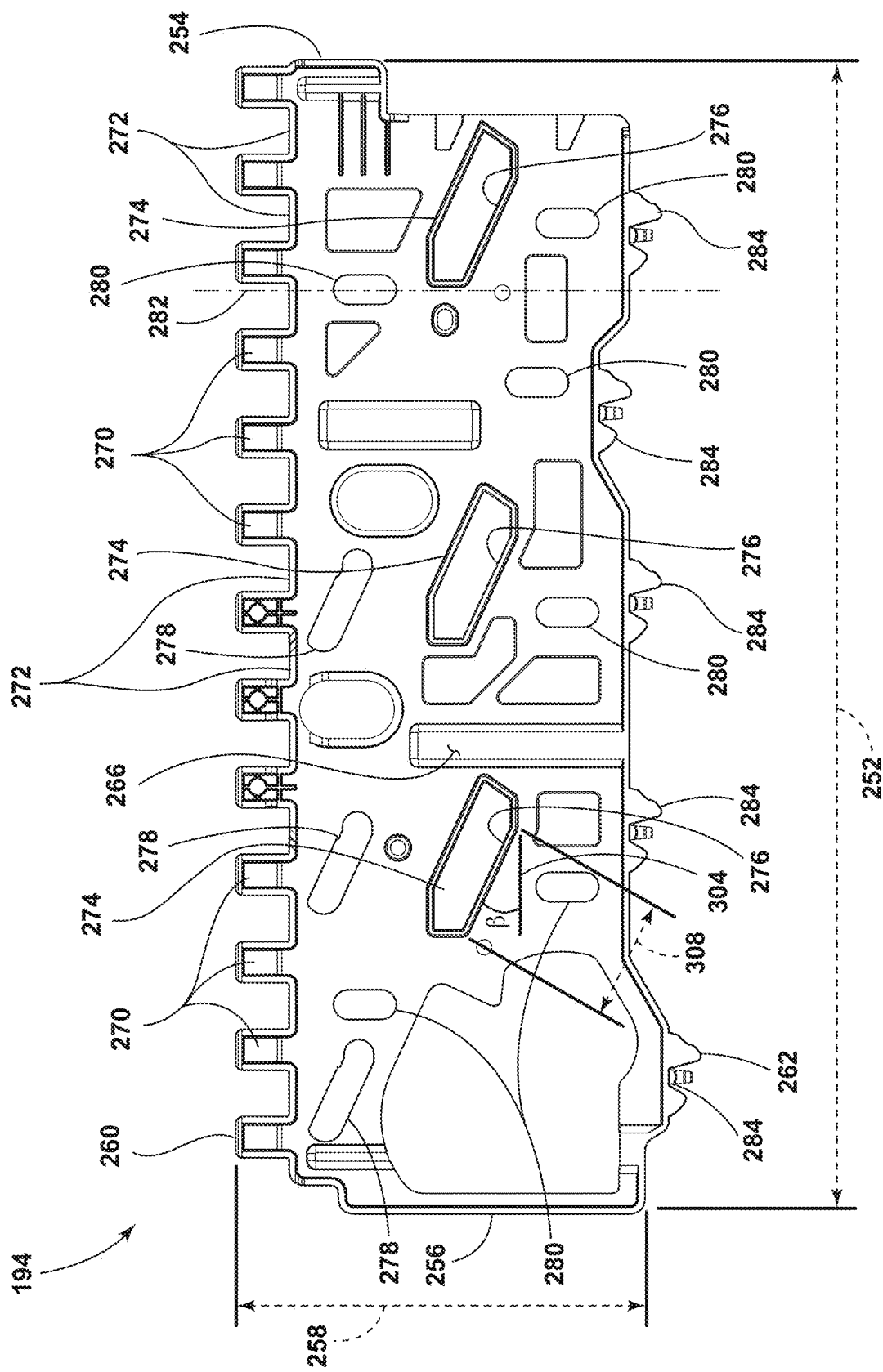
FIG. 22 is a top view of the second bracket of FIG. 17, illustrating guides that define the movement of the second bracket along an axis of movement (different than the axis of movement of the first bracket), and illustrating projection receivers to receive the projections of the first bracket, the projection receivers having a contact surface that forms an angle relative to the axis of movement of the first bracket (the angle being different than the angle between the axis of movement of the first bracket and the axis of movement of the second bracket)
Figure 23:
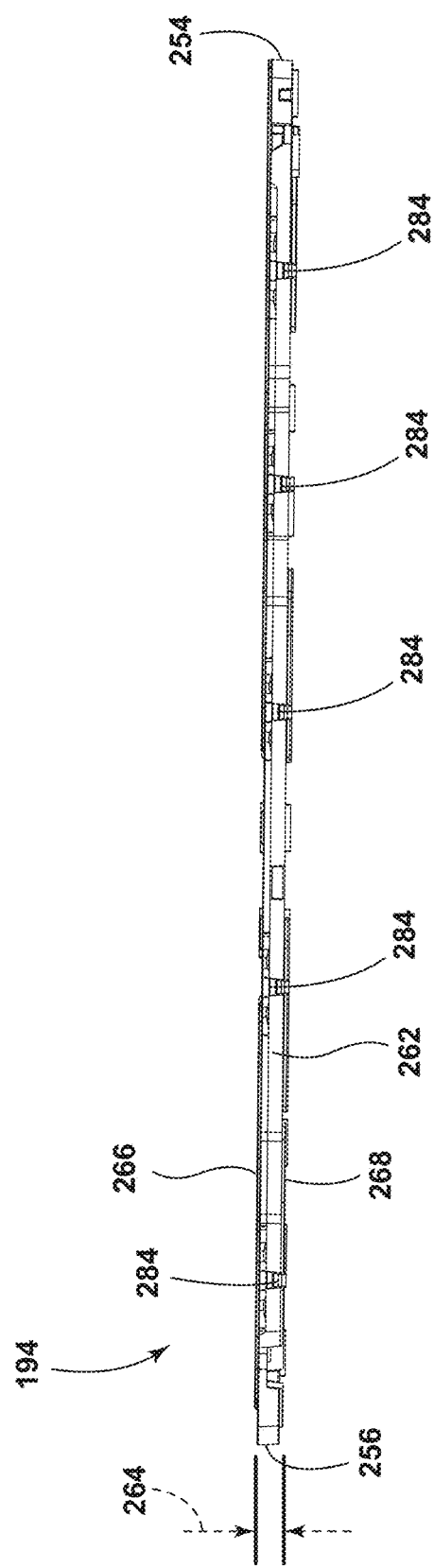
FIG. 23 is an elevational view of the second bracket of FIG. 17, illustrating spring receivers extending along a second lateral side of the second bracket.
Figure 24:
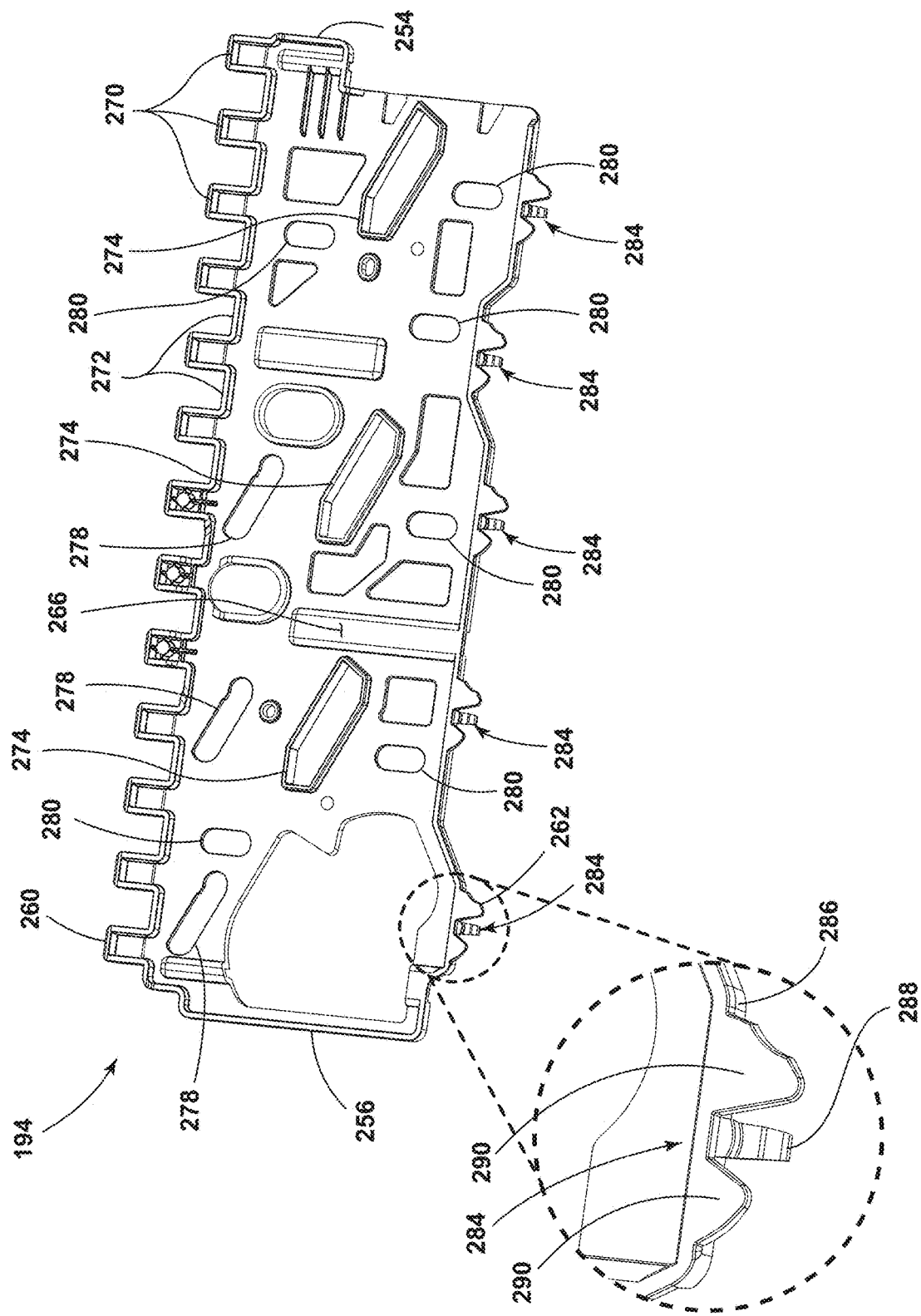
FIG. 24 is a top perspective view of the second bracket of FIG. 17, illustrating the projections and recesses extending along a first lateral side of the second bracket, and illustrating that each spring receiver includes an edge surface, a bottom tab extending from the edge surface, and two top tabs extending from the edge surface closer to the top surface than the bottom tab.
Figure 25:
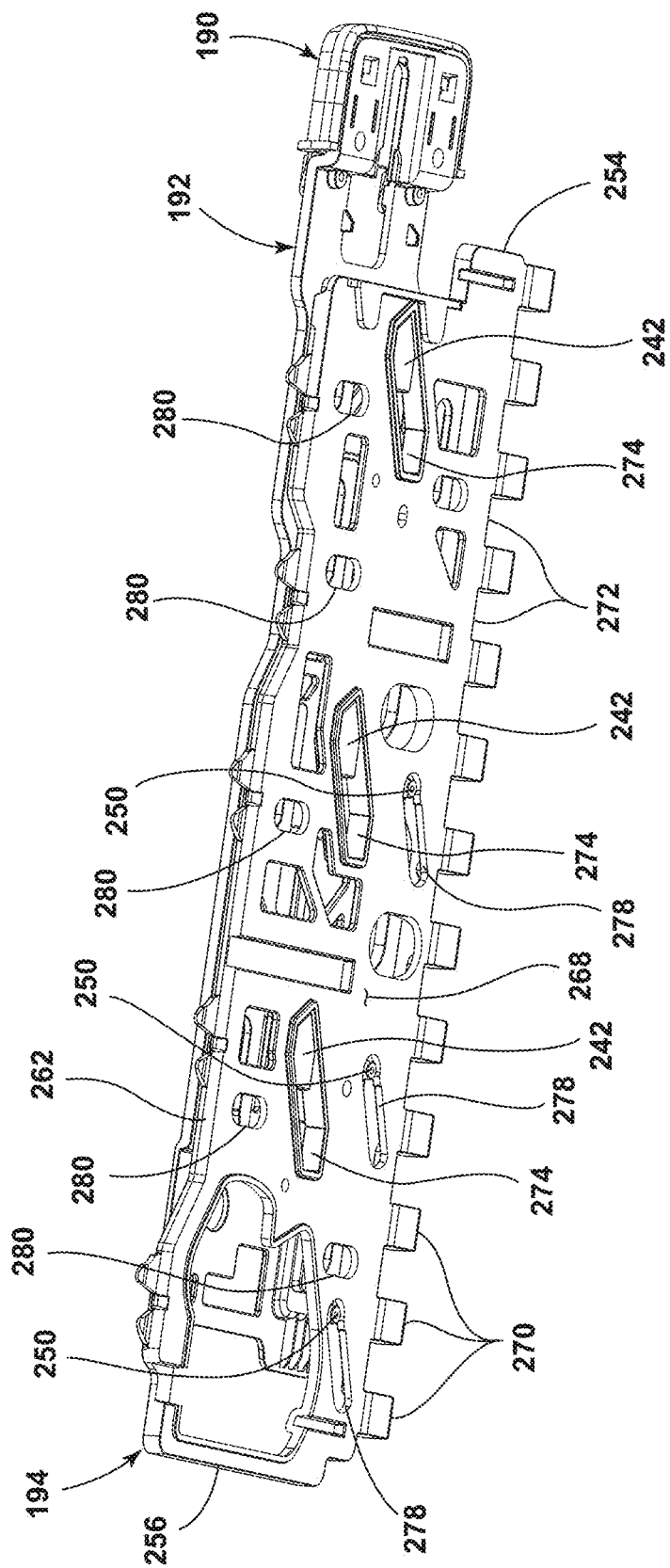
FIG. 25 is a bottom perspective view of the first bracket layered over the second bracket, illustrating that the projections of the first bracket extend into the projection receivers of the second bracket.
Figure 26:
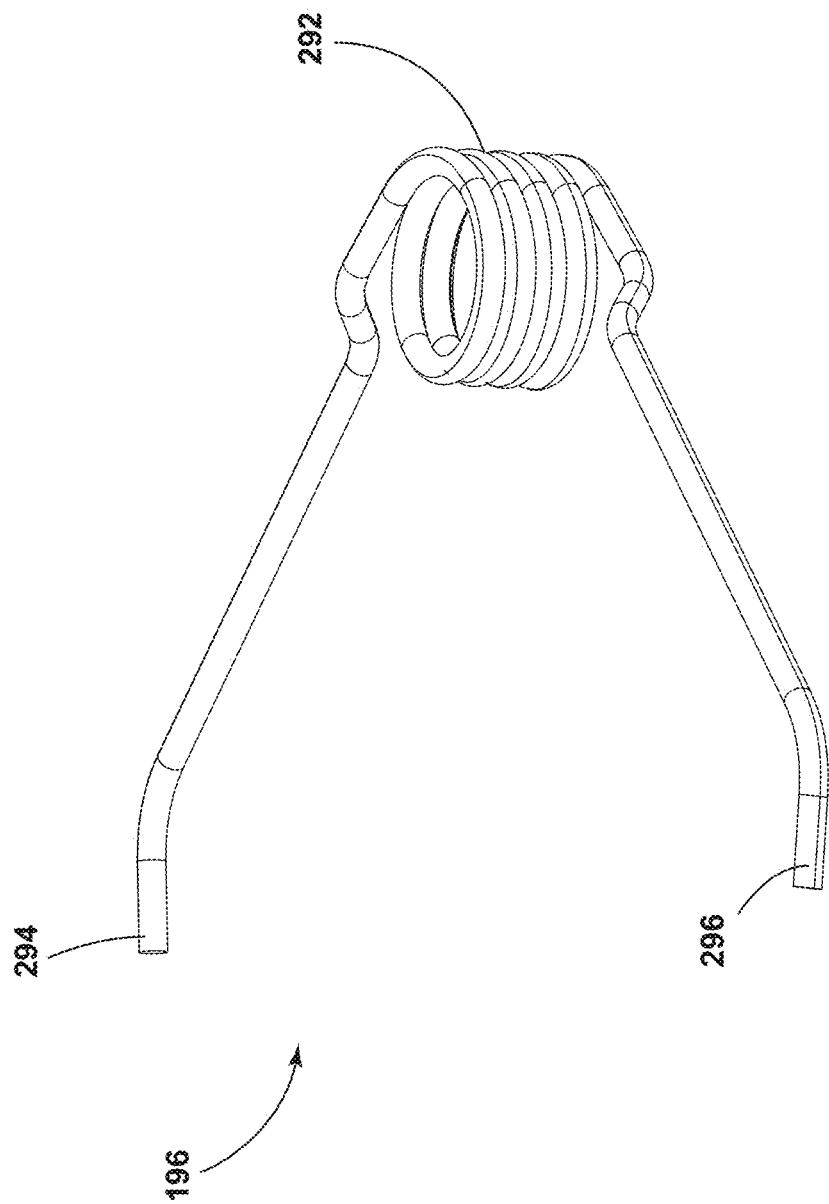
FIG. 26 is a perspective view of one of the springs of FIG. 17, illustrating a wound portion, and a first end and a second end extending from the wound portion.

Referring more particularly also to FIG. 18, the button 190 includes a top wall 198 and a lip 200 that extends downward from the top wall 198 and extends contiguously from a first side 202, to a forward portion 204, and to a second side 206. The top wall 198 has a bottom surface 208 that faces generally downward. The top wall 198 and the lip 200 thus form a pocket or partial chamber 210. The button 190 further includes a pair of attachment tabs 212 that extend rearward from the top wall 198.

Referring more particularly to FIGS. 19-26, the first bracket 192 has a length 214 extending from a forward end 216 to a rear end 218, a width 220 extending from a first lateral side 222 to a second lateral side 224, and a height 226 extending from a top surface 228 to a bottom surface 230. In the illustrated embodiment, the first bracket 192 is relatively flat, with the length 214 being greater than the width 220, and both the length 214 and the width 220 being substantially greater than the height 226.

The first bracket 192 is attached to the button 190, such that manipulation of the button 190 also moves the first bracket 192. More specifically, the first bracket 192 includes a main body 232 and an attachment tab 234 that extends forward from the main body 232. The attachment tab 234 is stepped with a first level 236 that extends forward from the main body 232 and then terminates in a second level 238, which is stepped vertically below (that is, lower than) the first level 236. The second level 238 is slotted into the chamber 210 of the button 190, with the top surface 228 of the first bracket 192 at the second level 238 facing and supporting the bottom surface 208 of the top wall 198 of the button 190. The forward portion 204 of the lip 200 of the button 190 extends over and covers the forward end 216 of the first bracket 192. The attachment tabs 212 of the button 190 extend over the top surface 228 of the first bracket 192 at the first level 236. Fasteners 240 secure the attachment of the button 190 to the first bracket 192.

The main body 232 of the first bracket 192 further includes a first set of projections 242, which as will be discussed below, translate movement of the first bracket 192 to the second bracket 194. The illustrated embodiment includes three projections 242. Other embodiments include only one projection 242, while other embodiments include two or more than three projections 242. The projections 242 extend downward toward the floor 154 of the bottom housing 108. Each projection 242 has a contact surface 244 that contacts and moves the second bracket 194 as discussed below, when the first bracket 192 is forced to move via occupant manipulation of the button 190. The contact surface 244 forms an acute angle β relative to the axis of movement 304. In the illustrated embodiment the angle β is 25 degrees. In other embodiments, the angle β is between 1 and 89 degrees, such as between 10 and 50 degrees, and between 20 degrees and 30 degrees.

The main body 232 of the first bracket 192 further includes a first set of guides 246. The guides 246 are elongated apertures or slots through the width 220 of the first bracket 192. The guides 246 are elongated lengthwise along the first bracket 192 parallel to the axis of movement 304.

The guides 246 limit movement of the first bracket 192 to movement along the axis of movement 304.

The attachment tab 234 of the first bracket 192 further includes a guide 248. The guide 248 is also an elongated aperture or slot through the width 220 of the first bracket 192 at the second level 238 of the attachment tab 234. The guide 248 is also elongated lengthwise along the first bracket 192 parallel to the axis of movement 304 and parallel to the first set of guides 246. The guide 248, like the guides 246, limit movement of the first bracket 192 to movement along the axis of movement 304.

The main body 232 of the first bracket 192 further includes a second set of projections 250. The projections 250 extend downward from the bottom surface 230 toward the floor 154 of the bottom housing 108. The projections 250 are disposed near the first lateral side 222. The projections 250 prevent inadvertent movement of the second bracket 194, as discussed below.

The main body 232 of the first bracket 192 sits within the second region 142 of the bottom housing 108. The bottom surface 230 of the first bracket 192 faces toward the floor 154 of the second region 142 of the bottom housing 108. The second lateral side 224 of the first bracket 192 faces the second lateral side 138 of the bottom housing 108. The projections 162 that extend upward from the floor 154 of the second region 142 of the bottom housing 108 project through the guides 246 of the main body 232 of the first bracket 192. The projection 164 near the mouth 158 of the second region 142 of the bottom housing 108 extends through the guide 248 of the attachment tab 234 of the first bracket 192. The projections 162 and the guides 246, as well as the projection 164 and the guide 248, cooperate to limit movement of the first bracket 192 to movement along the axis of movement 304.

Referring more particularly to FIGS. 22-26, the second bracket 194 has a length 252 from a forward end 254 to a rear end 256, a width 258 from a first lateral side 260 to a second lateral side 262, and a height 264 from a top surface 266 to a bottom surface 268. In the illustrated embodiment, the second bracket 194 is relatively flat, with the length 252 and the width 258 being significantly greater than the height 264.

The second bracket 194 sits within the second region 142 of the bottom housing 108. The bottom surface 268 of the second bracket 194 faces toward the floor 154 of the bottom housing 108. The forward end 254 faces toward the forward side 133 of the bottom housing 108. The rear end 256 faces toward the rear side 134 of the bottom housing 108. The first lateral side 260 faces toward the first lateral side 136 of the bottom housing 108. The second lateral side 262 faces toward the second lateral side 138 of the bottom housing 108.

The second bracket 194 includes a plurality of projections 270 and a plurality of recesses 272 disposed at the first lateral side 260. The projections 270 and the recesses 272 alternate. The projections 270 and the recesses 272 are configured to interdigitate with the projections 100 and recesses 98 of the anchor 96. In the illustrated embodiment, the projections 270 of the second bracket 194 and the projections 100 of the anchor 96 extend in opposite directions and orthogonal to the first direction 306 and the axis of movement 54 of the positionable platform 48. As will be discussed below, when the button 190 is not manipulated in the first direction 306, several projections 270 of the second bracket 194 are interdigitated with the projections 100 of the anchor 96, and thus the positionable platform 48 cannot move along the axis of movement 54. The projections 270 project toward the first lateral side 136 of the bottom housing 108 and toward the channel 184 of the channel region 144 of the bottom housing 108.

The second bracket 194 further includes projection receivers 274. The projection receivers 274 are apertures through the height 264. Each projection receiver 274 receives one of the projections 242 of the first bracket 192. Each projection receiver 274 includes a contact surface 276 that contacts the contact surface 244 of one of the projections 242 of the first bracket 192 as the first bracket 192 moves in the first direction 306. Each contact surface 276 has a length 308 and forms the angle β relative to the axis of movement 304. The second bracket 194 further includes angled slots 278. The angled slots 278 extend in a direction that matches the angle β of the contact surface 276 and the projection receivers 274. The second set of projections 250 of the first bracket 192 extend through the angled slots 278.

The second bracket 194 and the first bracket 192 are layered. In the illustrated embodiment, the second bracket 194 is disposed between the floor 154 of the bottom housing 108 and the bottom surface 230 of the first bracket 192, with the top surface 266 of the second bracket 194 facing the bottom surface 230 of the first bracket 192. The layering of the second bracket 194 and the first bracket 192 allows the projections 242 of the first bracket 192 to extend downward into, and interact with, the projection receivers 274 of the second bracket 194.

The second bracket 194 further includes guides 280 that each receive one of the projections 162 that extend upward from the floor 154 of the second region 142 of the bottom housing 108. The projections 162 that extend through the guides 280 of the second bracket 194 additionally extend upward through the guides 246 of the first bracket 192. The layering of the second bracket 194 and the first bracket 192 allows the projections 162 to extend through the guides 280, 246 of both the second bracket 194 and the first bracket 192, respectively. The guide 280 extends along an axis of movement 282 that is, in the illustrated embodiment, orthogonal to the first direction 306 and the axis of movement 304 defined for the first bracket 192.

The second bracket 194 includes spring receivers 284 disposed along the second lateral side 262. Each of the spring receivers 284 receives one of the plurality of springs 196. In the illustrated embodiment, each spring receiver 284 includes an edge surface 286 disposed between a bottom tab 288 and two spaced apart top tabs 290. The bottom tab 288 and the two spaced apart top tabs 290 extend from the edge surface 286 laterally outward toward the second lateral side 138 of the bottom housing 108. The interaction between the spring receiver 284 and the spring 196 that the spring receiver 284 has received is discussed further below.

Each spring 196 includes a wound section 292, a first end 294 extending from the wound section 292, and a second end 296 also extending from the wound section 292. One of the projections 166 extending upward from the floor 154 of the second region 142 of the bottom housing 108 extends through the wound section 292 of each spring 196. The first end 294 of each spring 196 abuts the edge surface 286 of one of the spring receivers 284 of the second bracket 194, and extends between the bottom tab 288 and the two spaced apart top tabs 290. The first end 294 of each spring 196 is thus prevented from losing contact with the edge surface 286 of the second bracket 194. The second end 296 of each spring 196 abuts the vertical wall 170 of each spring receiver 168 of the bottom housing 108, with the lateral tab 172 disposed above the second end 296 and the floor 154 of the bottom housing 108 disposed below the second end 296. The second end 296 of each spring 196 is thus prevented from losing contact with the vertical wall 170 of each spring receiver 168 of the bottom housing 108.

Figure 27:
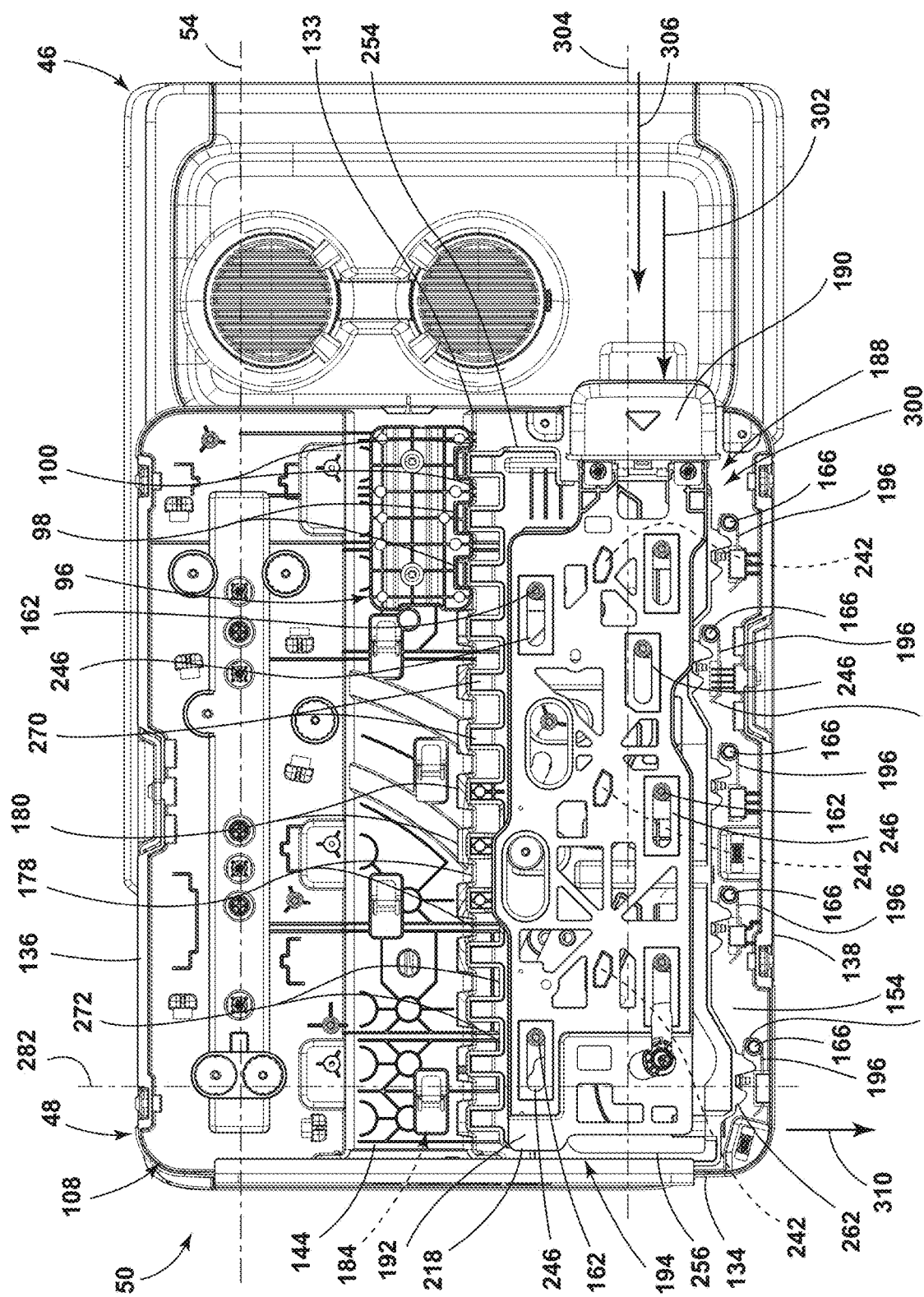
FIG. 27 is a top view of the positionable platform in the extreme rearward position (with the top housing assembly not illustrated and seeing through a portion of the channel region of the bottom housing) relative to the base, illustrating the releasable locking mechanism of FIG. 17 in an unlocked state after a force has moved the button in a first direction and has additionally moved the first bracket along its axis of movement toward the rear side of the bottom housing, which has caused the second bracket to move in a second direction along its axis of movement toward the second lateral side of the bottom housing thus withdrawing the projections of the second bracket from the recesses of the anchor.

Referring now additionally to FIG. 27, the releasable locking mechanism 188 has a locked state 298 (FIG. 17) and an unlocked state 300 (FIG. 27). When the releasable locking mechanism 188 is in the locked state 298, the second bracket 194 is in its closest position to the first lateral side 136 of the bottom housing 108. The projections 270 extend through the slots 180 of the channel region 144 of the bottom housing 108 and into the channel 184. One of the spaced walls 178 of the channel region 144 are disposed between each of the projections 270 of the second bracket 194. Each spaced wall 178 sits within a different recess 272 of the second bracket 194.

Figure 17:
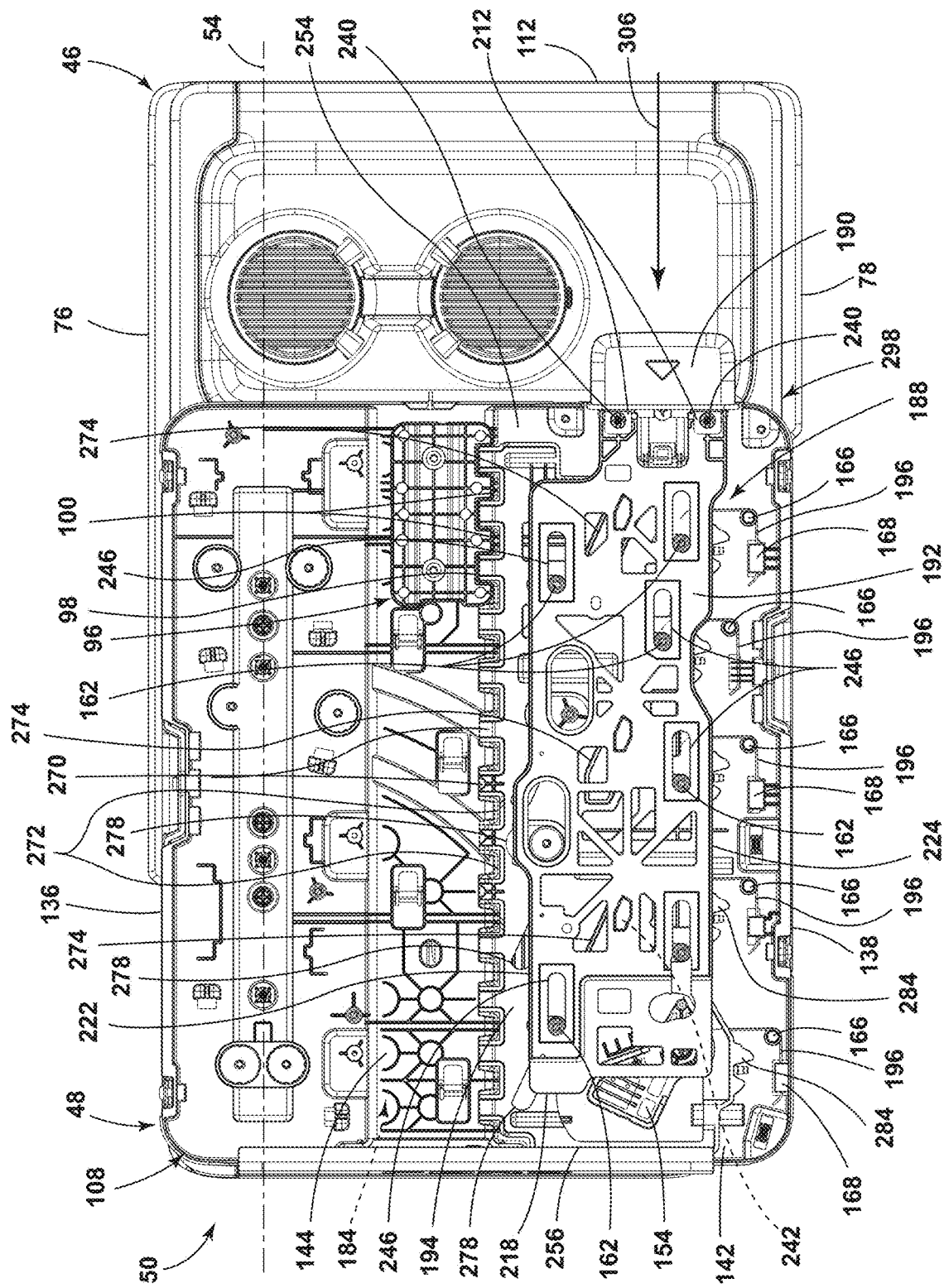
FIG. 17 is a top view of a releasable locking mechanism of the positionable platform of FIG. 3, illustrating that the releasable locking mechanism is disposed beneath the top housing assembly and above the bottom housing, illustrating that the releasable locking mechanism includes a first bracket layered over a second bracket, and a button attached to the first bracket, and illustrating that the releasable locking mechanism is in a locked state preventing movement of the positionable platform along the axis of movement because projections of the second bracket are interdigitated with the projections of the anchor of the base.

In the locked state 298, depending on the position of the positionable platform 48 along the axis of movement 54 between and including the extreme rearward position 50 and the extreme forward position 52, three of the projections 270 of the second bracket 194 extend into the recesses 98 between the projections 100 of the anchor 96. For example, when the positionable platform 48 is in the extreme rearward position 50 (such as illustrated in FIG. 17), the three projections 270 nearest the forward end 254 of the second bracket 194 are disposed within the recesses 98 of the anchor 96. However, when the positionable platform 48 is in the extreme forward position 52, the three projections 270 nearest the rear end 256 of the second bracket 194 are disposed within the recesses 98 of the anchor 96. The projections 100 of the anchor 96 and the three projections 270 of the second bracket 194 disposed in the recesses 98 of the anchor 96 are thus interdigitated in the locked state 298. The interdigitating of the projections 100 of the anchor 96 and the three projections 270 of the second bracket 194 prevent movement of the second bracket 194 along the axis of movement 54 and thus prevent movement of the positionable platform 48 along the axis of movement 54. The projections 100 of the anchor 96 sit in the path that the projections 270 of the second bracket 194 would need to move along the axis of movement 54.

To cause the releasable locking mechanism 188 to be in the unlocked state 300 (FIG. 27), the occupant applies a force 302 that moves the button 190 in the first direction 306 along the axis of movement 304. The force 302 applied to the button 190 moves the button 190 through the mouth 158 at the forward side 133 of the bottom housing 108. Because the button 190 is attached to the first bracket 192, the force 302 pushing the button 190 in the first direction 306 additionally pushes the first bracket 192 in the first direction 306. As the first bracket 192 moves in the first direction 306, the rear end 218 of the first bracket 192 moves closer to the rear side 134 of the bottom housing 108. The forward end 216 of the first bracket 192 moves away from the forward side 133 of the bottom housing 108. The projections 162 extending upward from the floor 154 of the bottom housing 108 through the guides 246 of the first bracket 192 cooperate to limit movement of the first bracket 192 to the first direction 306. The projection 164 at the mouth 158 likewise cooperates with the guide 248 to limit the movement of the first bracket 192 in the same manner. In other words, the projections 162, 164 of the bottom housing 108 and the guides 246, 248 cooperate to limit movement of the first bracket 192 (and the button 190) to the axis of movement 304 parallel with the axis of movement 54 and the first direction 306.

As the button 190 moving in the first direction 306 forces the first bracket 192 to move in the first direction 306 as well, the contact surface 244 of each projection 242 of the first bracket 192 contacts, exerts a force against, and slides over a portion of the length 308 of the contact surface 276 of one of the projection receivers 274 of the second bracket 194. The guides 280 of the second bracket 194, and the projections 162 of the bottom housing 108 extending through those guides 280, cooperate to restrict the resulting movement of the second bracket 194 from the force 302 to a second direction 310 along the axis of movement 282. In short, the force 302 moving the button 190 and the first bracket 192 in the first direction 306, causes the second bracket 194 to move in the second direction 310. Moving in the second direction 310, the second lateral side 262 of the second bracket 194 becomes nearer to the second lateral side 138 of the bottom housing 108. Because the guides 280 of the second bracket 194 extend along the axis of movement 282, the rear end 256 of the second bracket 194 does not significantly move closer to the rear side 134 of the bottom housing 108. As the second bracket 194 moves in the second direction 310 toward the second lateral side 138 of the bottom housing 108, the second bracket 194 at least partially withdraws from the channel 184 such that the projections 270 of the second bracket 194 withdraw from the recesses 98 of the anchor 96 and no longer are interdigitated with the projections 100 of the anchor 96. Thus, the projections 100 of the anchor 96 and the projections 270 of the second bracket 194 are no longer positioned to counteract any force moving the positionable platform 48 along the axis of movement 54. Movement of the second bracket 194 toward the second lateral side 138 of the bottom housing 108 forces the first end 294 of each spring 196 closer to the second end 296. More specifically, the edge surface 286 of each spring receiver 284 of the second bracket 194 forces the first end 294 of the spring 196 toward the second end 296. The projections 166 of the bottom housing 108 rising up through the wound section 292 of each spring 196 hold the springs 196 in place. The springs 196 thus become excited and exert force countering the force 302. In other words, the springs 196 resists but does not prevent movement of the second bracket 194 along the axis of movement 282 of the second bracket 194.

Figure 28:
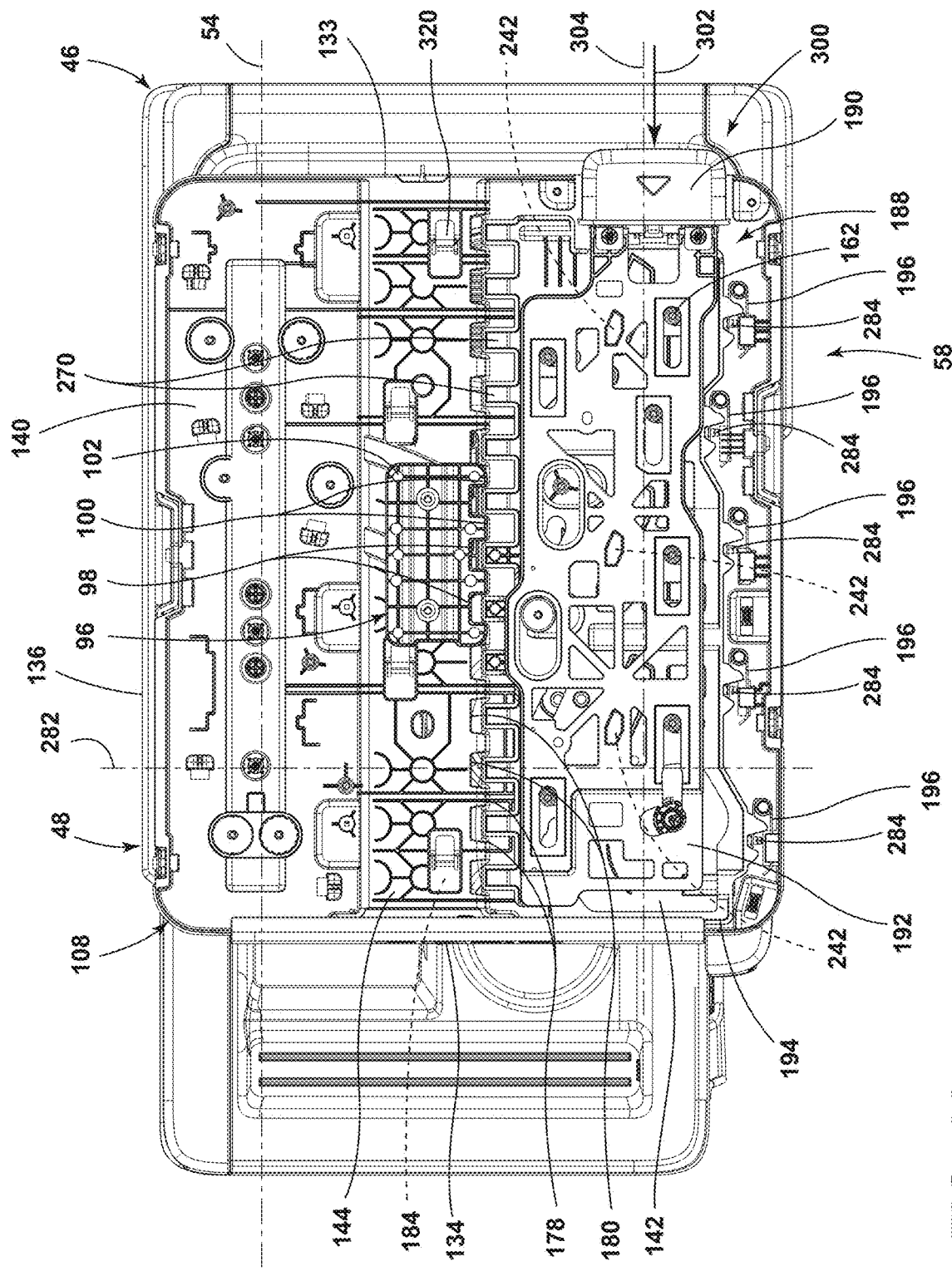
FIG. 28 is a top view of the positionable platform in one of the intermediate positions (with the top housing assembly not illustrated and seeing through a portion of the channel region of the bottom housing) relative to the base, illustrating the releasable locking mechanism of FIG. 17 still in the unlocked state because the force is applied to the button, and illustrating that the anchor of the base has changed location relative to the channel of the bottom housing and the projections of the second bracket.

Referring now additionally to FIG. 28, in this unlocked state 300 of the releasable locking mechanism 188, the positionable platform 48 can be positioned to the extreme forward position 52, the extreme rearward position 50, or some intermediate position 58 in between. As the positionable platform 48 changes position along the axis of movement 54, the channel region 144 of the bottom housing 108 moves relative to the anchor 96 on the base 46. The anchor 96 lies within the channel 184. The bottom surface 176 of the channel region 144 faces in the direction toward the anchor 96. The wing 102 of the anchor 96 points toward the vertical wall 182 transitioning between the first region 140 and the channel region 144. The projections 100 of the anchor 96 point toward the spaced walls 178 and spaced slots 180 transitioning between the channel region 144 and the second region 142 of the bottom housing 108. When the positionable platform 48 is in the extreme rearward position 50, the anchor 96 has its closest position to the forward side 133 of the bottom housing 108. When the positionable platform 48 is in the extreme forward position 52, the anchor 96 has its closest position to the rear side 134 of the bottom housing 108.

Figure 29:
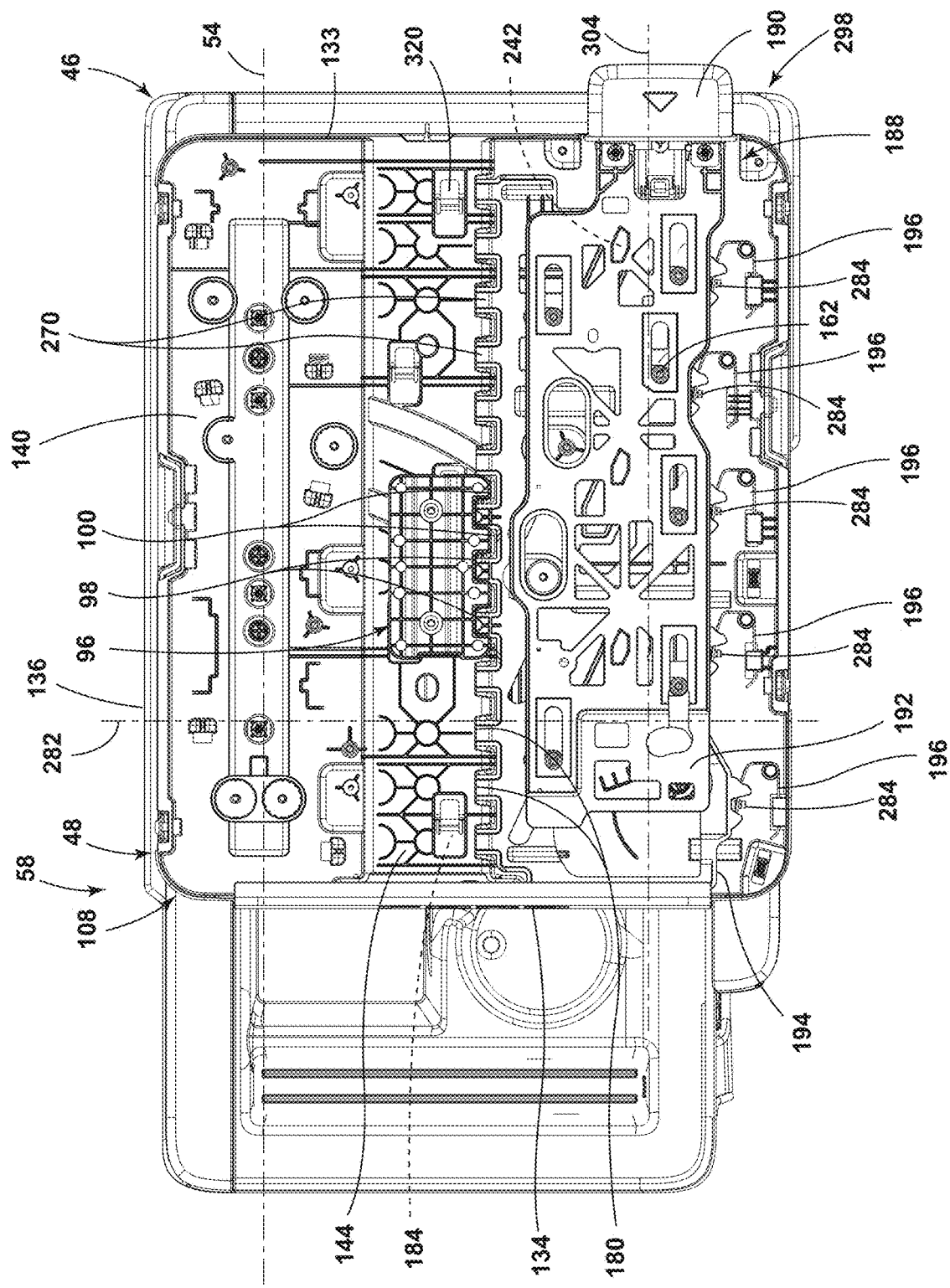
FIG. 29 is a top view of the positionable platform in one of the intermediate positions (with the top housing assembly not illustrated and seeing through a portion of the channel region of the bottom housing) relative to the base, illustrating the releasable locking mechanism of FIG. 17 having returned to the locked state because the force is no longer applied to the button, and illustrating that different projections of the second bracket are interdigitated with projections of the anchor, thus preventing the positionable platform from moving along its axis of movement from that intermediate position.

Referring now additionally to FIG. 29, when the occupant has positioned the positionable platform 48 to the desired position (such as one of the intermediate positions 58 illustrated) while manipulating the releasable locking mechanism 188 to the unlocked state 300, the occupant can stop manipulating the releasable locking mechanism 188 to the unlocked state 300 and allow the releasable locking mechanism 188 to transition to the locked state 298. In other words, when the occupant has placed the positionable platform 48 in the desired position, such as one of the intermediate positions 58, the occupant stops applying the force 302 to the button 190. Each spring 196, being in the excited state, exerts a force against the edge surface 286 of each spring receiver 284 of the second bracket 194 countering the force 302, which pushes the second bracket 194 back along the axis of movement 282 in an opposite direction as the second direction 310. The projections 270 of the second bracket 194 move toward the first lateral side 136 of the bottom housing 108 and reenter the channel 184 of the channel region 144 of the bottom housing 108 through the spaced slots 180 thereof. Three of the projections 270 of the second bracket 194 extend into the recesses 98 of the anchor 96 of the base 46. Those three projections 270 of the second bracket 194 thus interdigitate with the projections 100 of the anchor 96. The anchor 96 thus again prevents the positionable platform 48 along the axis of movement 54.

The springs 196 forcing the second bracket 194 to move along the axis of movement 282 in the opposite direction as the second direction 310 additionally forces the first bracket 192 to move along the axis of movement 304 in an opposite direction as the first direction 306. More specifically, the contact surface 276 of each projection receiver 274 of the second bracket 194 contacts, and applies a force to, one of the projections 242 of the first bracket 192. Because of the projections 162, 164 of the bottom housing 108 and the guides 246 of the first bracket 192 limiting movement of the first bracket 192 to along the axis of movement 304, the projection receivers 274 of the second bracket 194 force the first bracket 192 in the opposite direction as the first direction 306. The first bracket 192, being connected to the button 190, likewise forces the button 190 back out of the mouth 158 of the bottom housing 108. The releasable locking mechanism 188 is thus back in the locked state 298. The springs 196, being in tension even when the releasable locking mechanism 188 is in the locked state 298, prevents the second bracket 194 from disengaging from the anchor 96 when the force 302 is not pushing the button 190 in the first direction 306 and thus prevents the positionable platform 48 from moving position along the axis of movement 54. In other words, the springs 196 bias the releasable locking mechanism 188 to the locked state 298. Should the second bracket 194 attempt to move along the axis of movement 282 without the force 302 being applied to the button 190, then the additional projections 250 of the first bracket 192 would contact the angled slots 278 of the second bracket 194 and prevent such movement.

In the illustrated embodiment, the axis of movement 304 of the first bracket 192 and the axis of movement 282 of the second bracket 194 are orthogonal. However, they need not be orthogonal. An angle δ between the axis of movement 304 and the axis of movement 282 (see FIG. 28) can be less than 90 degrees and still perform the function described. The projections 100, 270 of the anchor 96 and the second bracket 194 may need to be modified to accommodate such an angular interdigitation. Likewise, the guides 280 of the second bracket 194 would need to match the axis of movement 282.

Figure 30:
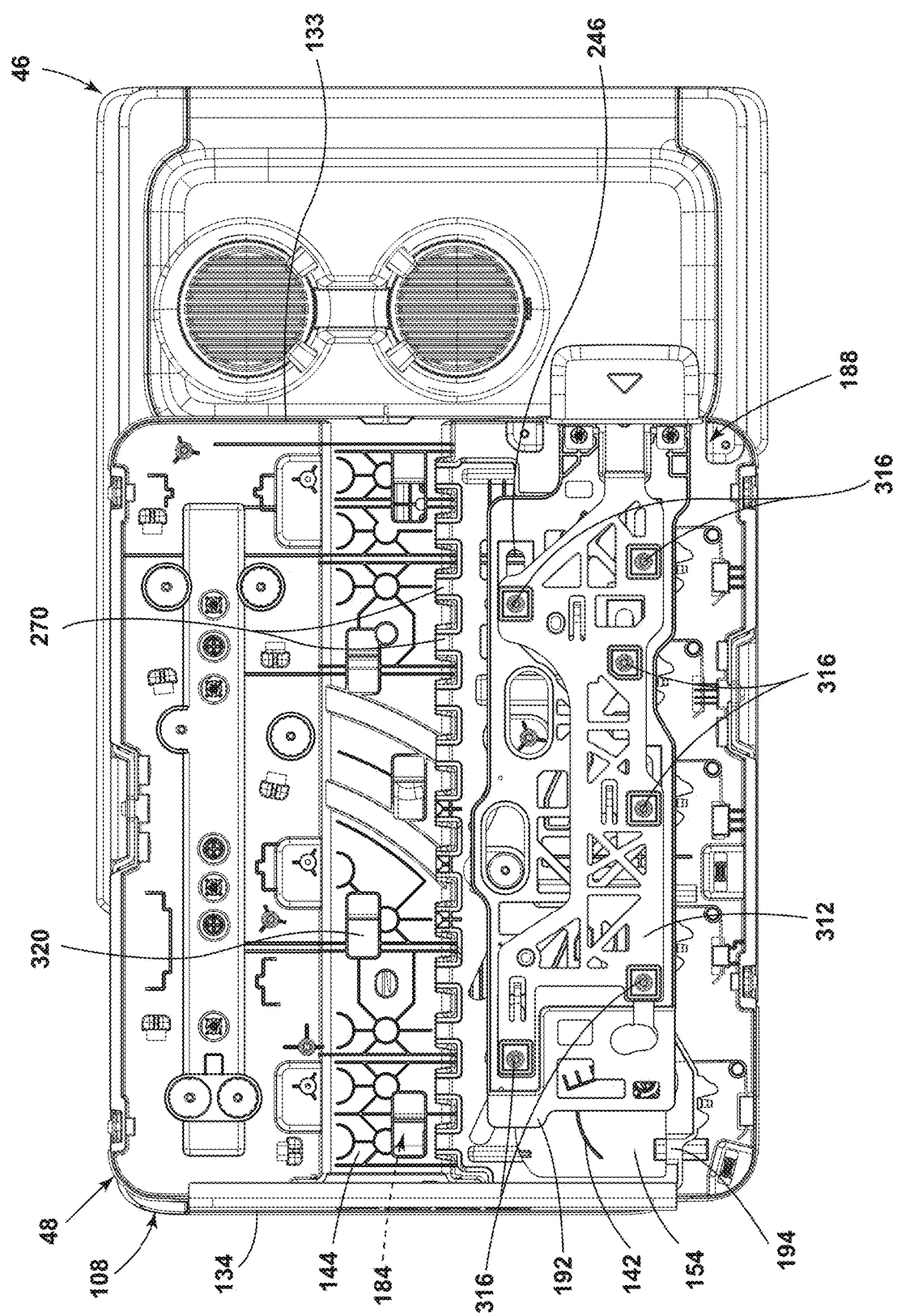
FIG. 30 is a top view of the positionable platform (with the top housing assembly not illustrated and seeing through a portion of the channel region of the bottom housing) coupled to the base, further illustrating a retainer bracket attached to the bottom housing that secures the releasable locking mechanism to the bottom housing.

Referring now additionally to FIG. 30, In the illustrated embodiment, the positionable platform 48 further includes a retaining bracket 312. The retaining bracket 312 is positioned over the first bracket 192 and is attached to the bottom housing 108. More specifically, the projections 162 that extend upward from the floor 154 of the second region 142 of the bottom housing 108 and extend through the guides 280 of the second bracket 194 and then the guides 246 of the first bracket 192 include fastener receivers 314 (see FIG. 14). Fasteners 316 extend through apertures (not illustrated) of the retaining bracket 312 and into the fastener receivers 314, and thus fasten the retaining bracket 312 to the bottom housing 108, with the first bracket 192 and the second bracket 194 secured between the bottom housing 108 and the retaining bracket 312.

Figure 31:
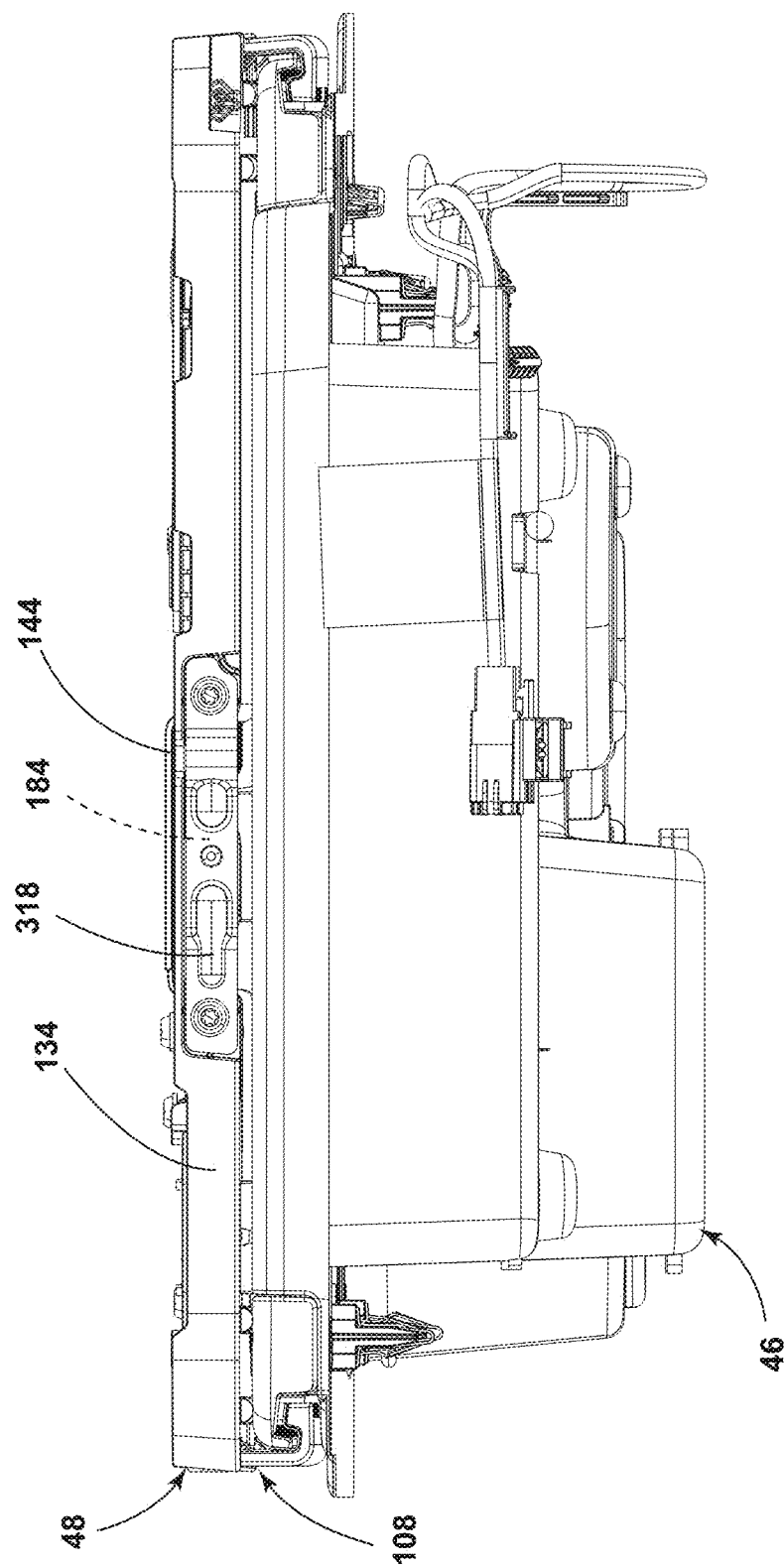
FIG. 31 is a rear view of the positionable platform (with the top housing assembly not illustrated) coupled to the base, further illustrating a stopper attached to the bottom housing and covering the channel.

Referring now additionally to FIG. 31, in the illustrated embodiment, the positionable platform 48 further includes a stopper 318. The stopper 318 is positioned at the rear side 134 of the bottom housing 108 to cap the channel 184 of the channel region 144. The stopper 318 thus prevents the positionable platform 48 from exceeding the extreme forward position 52 along the axis of movement 54, because the stopper 318 encounters the anchor 96.

Figure 32:
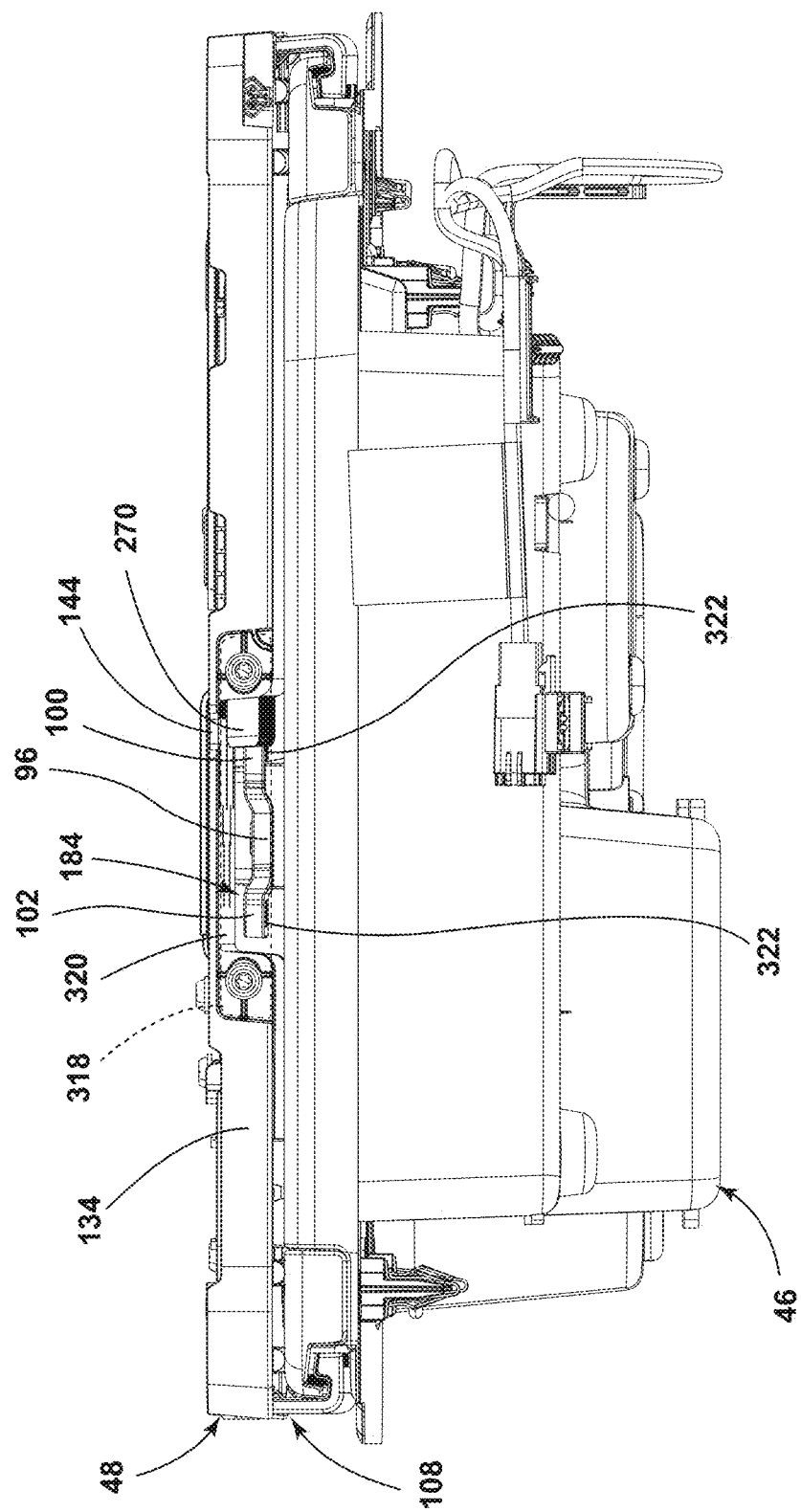
FIG. 32 is the same view of FIG. 31 without the stopper, further illustrating a channel reinforcement bracket extending the length of the channel.

Referring now additionally to FIG. 32, in the illustrated embodiment, the positionable platform 48 includes a channel reinforcement bracket 320. The channel reinforcement bracket 320 extends approximately the length 186 of the channel 184. The channel reinforcement bracket 320 generally matches the contour of the channel 184 and includes alternating spaced walls and slots (not illustrated) that match the alternating spaced walls 178 and slots 180 transitioning between the channel region 144 and the second region 142 so that the projections 270 of the second bracket 194 can extend through the slots of the channel reinforcement bracket 320 to enter the channel 184. The channel reinforcement bracket 320 further includes bottom portions 322 that extend beneath the projections 100 and the wing 102 of the anchor 96.

The moving parts of the releasable locking mechanism 188 (the first bracket 192, the second bracket 194, and the springs 196), except for the button 190, are inaccessible from the interior 12 of the vehicle 10. The first bracket 192, the second bracket 194, and the springs 196 are protected beneath the top surface 110 of the positionable platform 48 provided by the top housing assembly 106 and the bottom housing 108 of the positionable platform 48. Therefore, the first bracket 192, the second bracket 194, and the springs 196 do not detract from the aesthetics of the center console 44 or the positionable platform 48.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the afore-mentioned structure without departure from the concepts of the present disclosure, and further it is to be understood that such concepts are intended to be covered by the following claims unless these claims by their language expressly state otherwise.

What is claimed is:

1. A positionable platform for an interior of a vehicle comprising:
   a planar top surface;
   a bottom housing with a channel; and
   a releasable locking mechanism disposed between the planar top surface and the bottom housing, the releasable locking mechanism including:
      a first bracket;
      a second bracket layered beneath the first bracket;

a button accessible for manipulation connected to the first bracket;
a locked state where the second bracket extends into the channel; and
an unlocked state where movement of the button in a first direction causes movement of the first bracket in the first direction, which causes movement of the second bracket in a second direction different than the first direction that at least partially withdraws the second bracket from the channel.

2. The positionable platform of claim 1,
the bottom housing further including:
a channel region defining the channel and having a top surface; and
another region having a floor disposed lower than the top surface of the channel region, and projections extending upward from the floor;
the first bracket including guides through which the projections of the bottom housing extend to limit movement of the first bracket to an axis of movement parallel to the first direction; and
the second bracket including guides through which the projections of the bottom housing additionally extend to limit movement of the second bracket to an axis of movement that is different than the axis of movement of the first bracket.

3. The positionable platform of claim 2,
the bottom housing further including vertical spaced walls transitioning between the channel region and the other region, and slots between each of the spaced walls that provide access from the other region to the channel defined by the channel region.

4. The positionable platform of claim 3,
the second bracket further includes projections that extend toward the channel;
in the locked state of the releasable locking mechanism, the projections of the second bracket extend through the vertical spaced walls of the bottom housing and into the channel of the bottom housing; and
in the unlocked state of the releasable locking mechanism, the projections of the second bracket do not extend through the vertical spaced walls of the bottom housing and into the channel of the bottom housing.

5. The positionable platform of claim 1,
the first bracket including an axis of movement along which the first bracket can move during transitions between the locked state and the unlocked state of the releasable locking mechanism, and a projection;
the second bracket including a projection receiver that receives the projection of the first bracket, and an axis of movement along which the second bracket can move during transitions between the locked state and the unlocked state of the releasable locking mechanism;
the projection of the first bracket moving along the axis of movement of the first bracket interacts with the projection receiver of the second bracket to cause the second bracket to move along the axis of movement of the second bracket; and
the axis of movement of the first bracket is different than the axis of movement of the second bracket.

6. The positionable platform of claim 5,
the projection receiver of the second bracket including a contact surface against which the projection of the first bracket slides as the first bracket moves along the axis of movement of the first bracket, and the projection sliding against the contact surface causes the second bracket to move along the axis of movement of the second bracket.

7. The positionable platform of claim 6,
the contact surface forms an acute angle relative to the axis of movement of the first bracket.

8. The positionable platform of claim 7,
the acute angle is between 20 degrees and 30 degrees.

9. The positionable platform of claim 5,
the axis of movement of the first bracket and the axis of movement of the second bracket are at least approximately orthogonal.

10. The positionable platform of claim 1,
the releasable locking mechanism further including a spring that biases the releasable locking mechanism to the locked state.

11. An interior of a vehicle comprising:
a positionable platform operably coupled to a base;
the base including:
an anchor having spaced projections; and
a pair of elongated rails;
the positionable platform including:
a pair of elongated tracks that cooperate with the pair of elongated rails of the positionable platform to define an axis of movement of the positionable platform, along which the positionable platform can be positioned to, from, and between an extreme rearward position, an extreme forward position, and an intermediate position between the extreme rearward position and the extreme forward position;
a relatively planar top surface;
a bottom housing; and
a releasable locking mechanism disposed between the top surface and the bottom housing, the releasable locking mechanism including:
a first bracket;
a second bracket layered adjacent to the first bracket, the second bracket having spaced projections;
a locked state where the projections of the second bracket are interdigitated with the projections of the anchor of the base such that the positionable platform cannot move along the axis of movement relative to the base; and
an unlocked state where change in position of the first bracket from the locked state causes change in position of the second bracket from the locked state and the projections of the second bracket are not interdigitated with the projections of the anchor of the base such that the positionable platform can move along the axis of movement relative to the base.

12. The interior of claim 11,
the first bracket moves along an axis of movement as the releasable locking mechanism transitions between the locked state and the unlocked state; and
the axis of movement of the first bracket is parallel to the axis of movement of the positionable platform.

13. The interior of claim 11,
the first bracket moves along an axis of movement as the releasable locking mechanism transitions between the locked state and the unlocked state;
the second bracket moves along an axis of movement as the releasable locking mechanism transitions between the locked state and the unlocked state; and
the axis of movement of the second bracket is at least approximately orthogonal to the axis of movement of the first bracket.

14. The interior of claim 11,
the first bracket includes a projection and moves along an axis of movement as the releasable locking mechanism transitions between the locked state and the unlocked state;
the second bracket includes a projection receiver into which the projection of the first bracket extends;
during movement of the first bracket along the axis of movement, the projection of the first bracket contacts the projection receiver of the second bracket and causes the second bracket to move along an axis of movement that is different than the axis of movement of the first bracket.

15. The interior of claim 14,
the projection receiver of the second bracket has a contact surface that contacts the projection of the first bracket, and the contact surface forms an acute angle relative to the axis of movement of the first bracket.

16. The interior of claim 11,
the releasable locking mechanism further including a button attached to the first bracket, and the button is accessible for manipulation from the interior to cause the releasable locking mechanism to transition from the locked state to the unlocked state.

17. The interior of claim 11,
the bottom housing includes a channel region and another region adjacent to the channel region;
the channel region forms a channel in which the anchor of the base is disposed;
the first bracket includes guides that define an axis of movement of the first bracket as the releasable locking mechanism transitions between the locked state and the unlocked state;
the second bracket includes guides that define an axis of movement of the second bracket as the releasable locking mechanism transitions between the locked state and the unlocked state;
the other region of the bottom housing includes a floor and projections that extend orthogonally from the floor, each of the projections extending through one of the guides of the first bracket and one of the guides of the second bracket; and
in the locked state, the projections of the second bracket extend from the other region of the bottom housing and into the channel to interdigitate with the projections of the anchor.

18. The interior of claim 17,
the bottom housing further includes spaced walls and slots between each of the spaced walls that define a transition between the channel region and the other region; and
in the locked state, the projections of the second bracket extend through slots of the bottom housing, and the spaced walls of the bottom housing are disposed in recesses between the projections of the second bracket.

19. The interior of claim 18,
the releasable locking mechanism further including a spring with a wound section, a first end extending from the wound section, and a second end extending from the wound section;
the other region of the bottom housing includes an additional projection that extends orthogonally from the floor and extends through the wound section of the spring;
the first end of the spring contacts the second bracket;
the second end of the spring contacts the bottom housing; and
the spring resists movement of the second bracket along the axis of movement of the second bracket.

20. The interior of claim 11,
in the locked state, only some of the projections of the second bracket interdigitate with the projections of the anchor;
the projections of the second bracket that interdigitate with the projections of the anchor when the positionable platform is in the extreme rearward position are different than the projections of the second bracket that interdigitate with the projections of the anchor when the positionable platform is in the extreme forward position; and
the projections of the second bracket that interdigitate with the projections of the anchor when the positionable platform is in the intermediate position are different than the projections of the second bracket that interdigitate with the projections of the anchor when the positionable platform is in the extreme rearward position or the extreme forward position.

* * * * *